(12) United States Patent
Akashi et al.

(10) Patent No.: US 11,967,138 B2
(45) Date of Patent: Apr. 23, 2024

(54) PROCESSING APPARATUS, INFORMATION PROCESSING METHOD AND RECORDING MEDIUM

(71) Applicant: NEC Corporation, Tokyo (JP)

(72) Inventors: Ryuichi Akashi, Tokyo (JP); Takahiro Toizumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/639,952

(22) PCT Filed: Mar. 3, 2021

(86) PCT No.: PCT/JP2021/008105
§ 371 (c)(1),
(2) Date: Mar. 3, 2022

(87) PCT Pub. No.: WO2022/185436
PCT Pub. Date: Sep. 9, 2022

(65) Prior Publication Data
US 2023/0162491 A1 May 25, 2023

(51) Int. Cl.
G06V 10/77 (2022.01)
G06V 10/774 (2022.01)
G06V 10/776 (2022.01)
G06V 40/18 (2022.01)

(52) U.S. Cl.
CPC ........ *G06V 10/776* (2022.01); *G06V 10/7715* (2022.01); *G06V 10/774* (2022.01); *G06V 40/193* (2022.01)

(58) Field of Classification Search
CPC ............. G06V 10/776; G06V 10/7715; G06V 10/774; G06V 40/193
See application file for complete search history.

(56) References Cited

U.S. PATENT DOCUMENTS

| | | | |
|---|---|---|---|
| 2006/0204052 A1* | 9/2006 | Yokouchi | G06T 7/70 382/117 |
| 2007/0274570 A1 | 11/2007 | Hamza | |
| 2012/0057756 A1* | 3/2012 | Yoon | G06F 18/214 382/104 |
| 2014/0153836 A1* | 6/2014 | Tobita | G06T 15/503 382/218 |
| 2016/0004303 A1* | 1/2016 | Arar | G06F 3/013 345/156 |

(Continued)

FOREIGN PATENT DOCUMENTS

| | | |
|---|---|---|
| JP | 2005-004781 A | 1/2005 |
| JP | 2009-529200 A | 8/2009 |

(Continued)

OTHER PUBLICATIONS

International Search Report for PCT Application No. PCT/JP2021/008105, dated Apr. 27, 2021.

*Primary Examiner* — Md K Talukder
(74) *Attorney, Agent, or Firm* — Sughrue Mion, PLLC

(57) ABSTRACT

An information processing apparatus (2) includes: an extracting unit (212) that extracts a key point (KP) of a target object as a target key point (KP1) from an input image (IMG1); and a calculating unit (213) that calculates, as a score (SC) of the input image from which the target key point is extracted, an index value related to a reliability of the target key point based on the target key point.

10 Claims, 6 Drawing Sheets

(56) References Cited

U.S. PATENT DOCUMENTS

| | | | |
|---|---|---|---|
| 2016/0150211 A1 | 5/2016 | Hwang et al. | |
| 2016/0335495 A1 | 11/2016 | Kim et al. | |
| 2017/0111576 A1* | 4/2017 | Tojo | G06T 3/40 |
| 2017/0243063 A1 | 8/2017 | Kaneko et al. | |
| 2018/0088158 A1* | 3/2018 | Toizumi | G01R 21/06 |
| 2019/0197690 A1* | 6/2019 | Kang | G06V 10/141 |
| 2019/0318151 A1* | 10/2019 | Shichijo | G06V 10/761 |
| 2019/0354746 A1* | 11/2019 | Zhang | G06V 40/45 |
| 2020/0117948 A1* | 4/2020 | Kong | G06F 18/217 |
| 2020/0183490 A1* | 6/2020 | Klingström | G06T 7/73 |
| 2020/0184198 A1* | 6/2020 | Takahashi | G06V 40/172 |
| 2020/0257888 A1 | 8/2020 | Ebihara | |
| 2020/0293764 A1* | 9/2020 | Osawa | G06T 7/00 |
| 2020/0371586 A1* | 11/2020 | Weng | G06T 7/74 |
| 2020/0410282 A1* | 12/2020 | Abrecht | G06V 10/7515 |
| 2021/0004570 A1* | 1/2021 | Zhai | G06T 7/0002 |
| 2022/0038620 A1* | 2/2022 | Demers | G06V 10/764 |
| 2022/0070364 A1* | 3/2022 | Inoue | H04N 23/695 |
| 2023/0162491 A1* | 5/2023 | Akashi | G06V 40/193 |
| | | | 382/117 |

FOREIGN PATENT DOCUMENTS

| | | |
|---|---|---|
| JP | 2012-212325 A | 11/2012 |
| JP | 2016-100899 A | 5/2016 |
| JP | 2017-503276 A | 1/2017 |
| JP | 2017-151556 A | 8/2017 |
| WO | 2019/003973 A1 | 1/2019 |
| WO | 2019/078310 A1 | 4/2019 |
| WO | 2019/102619 A1 | 5/2019 |
| WO | 2020/149001 A1 | 7/2020 |

* cited by examiner

PROCESSING APPARATUS, INFORMATION PROCESSING METHOD AND RECORDING MEDIUM

This application is a National Stage Entry of PCT/JP2021/008105 filed on Mar. 3, 2021, the contents of all of which are incorporated herein by reference, in their entirety.

TECHNICAL FIELD

The present disclosure relates to a technical field of an information processing apparatus, an information processing method and a recording medium that are configured to extract a key point (namely, a feature point) of a target object from an image, for example.

BACKGROUND ART

A Patent Literature 1 discloses one example of an information processing apparatus that is configured to extract a key point (namely, a feature point) of a target object from an image.

Specifically, the Patent Literature 1 discloses a face three dimensional shape estimation apparatus that obtains, from an image in which a target person is included, a face information indicating a position of a feature point of a face of the target person.

Additionally, there are Patent Literatures 2 to 6 as a background art document related to the present disclosure.

CITATION LIST

Patent Literature

Patent Literature 1: WO2020/149001A1
Patent Literature 2: WO2019/078310A1
Patent Literature 3: JP2017-503276A
Patent Literature 4: JP2017-151556A
Patent Literature 5: JP2009-529200A
Patent Literature 6: JP2005-004781A

SUMMARY

Technical Problem

It is an example object of the present disclosure to provide an information processing system, an information processing method and a recording medium that aims to an improvement of a technique disclosed in the background art document.

Solution to Problem

One example aspect of an information processing apparatus includes: an extracting unit that extracts a key point of a target object as a target key point from an input image; and a calculating unit that calculates, as a score of the input image from which the target key point is extracted, an index value related to a reliability of the target key point based on the target key point.

One example aspect of an information processing method includes: extracting a key point of a target object as a target key point from an input image; and calculating, as a score of the input image from which the target key point is extracted, an index value related to a reliability of the target key point based on the target key point.

One example aspect of a recording medium is a recording medium on which a computer program that allows a computer to execute an information processing method is recorded, the information processing method includes: extracting a key point of a target object as a target key point from an input image; and calculating, as a score of the input image from which the target key point is extracted, an index value related to a reliability of the target key point based on the target key point.

DESCRIPTION OF EXAMPLE EMBODIMENTS

Figure 1:
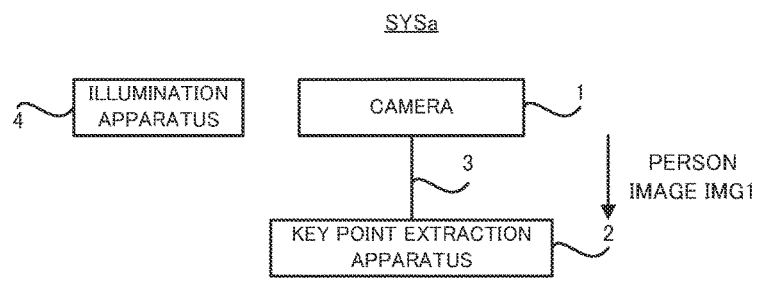
FIG. 1 is a block diagram that illustrates an entire configuration of a key point extraction system in a first example embodiment.

Next, an example embodiment of an information processing apparatus, an information processing method and a recording medium will be described with reference to the drawings. In the below described description, the example embodiment of the information processing apparatus, the information processing method and the recording medium will be described by using a key point extraction system SYS.

The key point extraction system SYS is configured to extract a key point KP of a target object from an image. The below described description explains an example in which the key point extraction system SYS is configured to extract the key point KP of a person that is included in a person image IMG1 from the person image IMG1 that is generated by capturing an image of the person (namely, a living body) that is one example of the target object. However, the key point extraction system SYS may be configured to extract the key point KP of any target object that is included in an image from the image in which any target object that is different from the person is included. A living body other than a human (for example, at least one of a mammal such as a dog, a cat and so on, a bird such as a sparrow and so on, a reptile such as a snake and so on, an amphibia such as a frog and so on and a fish such as a goldfish and so on) is one example of the target object. An object that is not the living body is another example of the target object. A robot that imitates the human or an animal is one example of the object that is not the living body.

Moreover, the below described description explains an example in which the key point extraction system SYS is configured to extract the key point KR of an iris of the person that is included in the person image IMG1 from the person image IMG1. This key point extraction system SYS may be used as an iris authentication system. The iris authentication system is a system that is configured to authenticate the person by using the iris. For example, the iris authentication system extracts a feature amount of the iris of the person that is included in the person image IMG1 based on the key point KP of the iris. For example, the iris authentication system may determine a loop-shaped iris area in which the iris is included in the person image IMG1 based on the key point KP of the iris. Specifically, the iris authentication system may determine the iris area based on the key point KP from which an inner outline of the iris is determinable and the key point KP from which an outer outline of the iris is determinable. Furthermore, the iris authentication system may delete an area part that overlaps with an eyelid from the loop-shaped iris area based on the key point KP from which an edge of the eyelid is determinable. Then, the iris authentication system may divide the iris area into a plurality of ring-shaped blocks, divide each block into a plurality of sectors, and extract a feature amount of each sector (for example, a feature amount related to a pattern of the iris included in the plurality of sectors, and a brightness value for example). Then, the iris authentication system may authenticate the person that is included in the person image IMG1 based on the extracted feature amount of the iris. Incidentally, as can be understandable from the description of the iris authentication system, the present disclosure clearly distinguishes a feature point (namely, the key point KP) from the feature amount of the iris.

However, the key point extraction system SYS may be configured to extract the key point KR of any part of the person that is included in the person image IMG1 from the person image IMG1. Apart that is usable for authenticating the person is one example of any part of the person. A face that is usable for a face authentication is another one example of the part that is usable for authenticating the person. A finger on which a fingerprint is formed that is usable for a fingerprint authentication is another one example of the part that is usable for authenticating the person. A hand on which a palm print is formed that is usable for a palm print authentication is another one example of the part that is usable for authenticating the person. A finger in which a pattern of a vein is formed that is usable for a vein authentication is another one example of the part that is usable for authenticating the person.

Next, the key point extraction system SYS will be described in more detail with reference to the drawings.

(1) Key Point Extraction System SYS in First Example Embodiment

Firstly, the key point extraction system SYS in a first example embodiment will be described. Note that the key point extraction system SYS in the first example embodiment is referred to as a "key point extraction system SYSa" in the below described description.

(1-1) Entire Configuration of Key Point Extraction System SYSa

Firstly, with reference to FIG. 1, an entire configuration of the key point extraction system SYSa in the first example embodiment will be described. FIG. 1 is a block diagram that illustrates the entire configuration of the key point extraction system SYSa in the first example embodiment.

As illustrated in FIG. 1, the key point extraction system SYSa includes a camera 1 and a key point extraction apparatus 2 that is one specific example of an "information processing apparatus". The key point extraction system SYSa may include single camera 1 or may include a plurality of cameras 2. The camera 1 and the key point extraction apparatus 2 are configured to communicate with each other through a communication network 3. The communication network 3 may include a wired communication network. The communication network 3 may include a wireless communication network.

The camera 1 is an imaging apparatus that is configured to capture an image of an imaging target range. The camera 1 includes a processing for generating an image in which the imaging target range is included by capturing the imaging target range. Since the key point extraction system SYSa extracts the key point KP of the iris of the person as described above, the person usually exists in the imaging target range. In this case, the camera 1 generates the person image IMG1 in which the person is included by capturing the image of the person. Especially, the camera 1 generates the person image IMG1 in which a face (especially, at least a part of the face including the iris and a part around the iris) of the person is included by capturing the image of the face (especially, at least a part of the face including the iris and a part around the iris) of the person. The camera 1 outputs the generated person image IMG1 to the key point extraction apparatus 2. Specifically, the camera 1 transmits the generated person image IMG1 to the key point extraction apparatus 2 through the communication network 3.

The key point extraction apparatus 2 receives the person image IMG1 transmitted from the camera 1 through the communication network 3. The key point extraction apparatus 2 performs a key point extraction operation for extracting the key point KP of the iris of the person that is included in the person image IMG1 from the received person image IMG1.

The key point extraction SYSa may include an illumination apparatus 4. The illumination apparatus 4 is configured to illuminate the imaging target area the image of which is capturable by the camera 1 with an illumination light. When the person exists in the imaging target range, the illumination apparatus 4 may configured to illuminate the person that exists in the imaging target range with the illumination light. In this case, the camera 1 may capture the image of the person that is illuminated by the illumination apparatus 4. However, the e key point extraction SYSa may not include the illumination apparatus 4.

(1-2) Configuration of Key Point Extraction Apparatus 2

Figure 2:
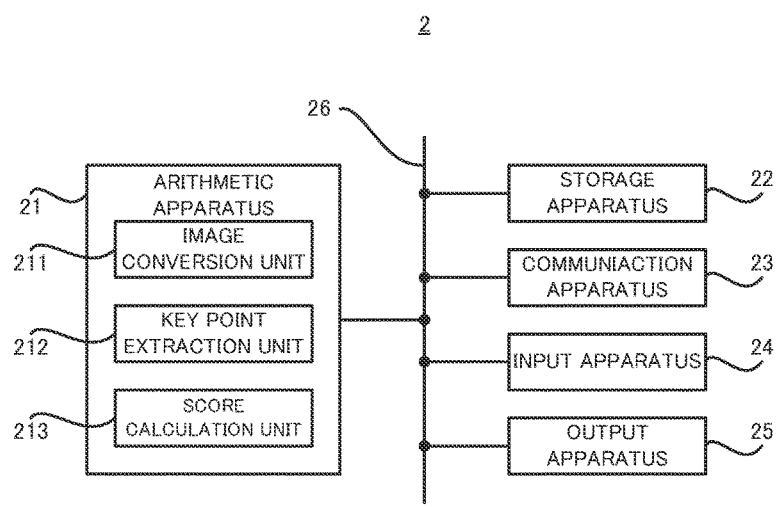
FIG. 2 is a block diagram that illustrates a configuration of a key point extraction apparatus in the first example embodiment.

Next, with reference to FIG. 2, a configuration of the key point extraction apparatus 2 in the first example embodiment will be described. FIG. 2 is a block diagram that illustrates the configuration of the key point extraction apparatus 2 in the first example embodiment.

As illustrated in FIG. 2, the key point extraction apparatus 2 includes an arithmetic apparatus 21, a storage apparatus 22 and a communication apparatus 23. Furthermore, the key point extraction apparatus 2 may include an input apparatus 24 and an output apparatus 25. However, the key point extraction apparatus 2 may not include at least one of the input apparatus 24 and the output apparatus 25. The arithmetic apparatus 21, the storage apparatus 22, the communication apparatus 23, the input apparatus 24 and the output apparatus 25 may be interconnected through a data bus 26.

The arithmetic apparatus 21 includes at least one of a CPU (Central Processing Unit), a GPU (Graphic Processing Unit) and a FPGA (Field Programmable Gate Array), for example. The arithmetic apparatus 21 reads a computer program. For example, the arithmetic apparatus 21 may read a computer program that is stored in the storage apparatus 22. For example, the arithmetic apparatus 21 may read a computer program that is stored in a non-transitory computer-readable recording medium by using a non-illustrated recording medium reading apparatus of the key point extraction apparatus 2. The arithmetic apparatus 21 may obtain (namely, download or read) a computer program from a non-illustrated apparatus that is placed outside the key point extraction apparatus 2 through the communication apparatus 23 (alternatively, other communication apparatus) The arithmetic apparatus 21 executes the read computer program. As a result, a logical functional block for performing an operation (for example, the above described key point extraction operation) that should be performed by the key point extraction apparatus 2 is implemented in the arithmetic apparatus 21. Namely, the arithmetic apparatus 21 is configured to serve as a controller for implementing the logical functional block for performing the operation (in other words, a processing) that should be performed by the key point extraction apparatus 2.

FIG. 2 illustrates one example of the logical functional block that is implemented in the arithmetic apparatus 21 for performing the key point extraction operation. As illustrated in FIG. 2, in the arithmetic apparatus 21, an image conversion unit 211 that is one specific example of "an image converting unit", a key point extraction unit 212 that is one specific example of "an extracting unit" and a score calculation unit 213 that is one specific example of "a calculating unit" are implemented. Note that a detail of an operation of each of the image conversion unit 211, the key point extraction unit 212 and the score calculation unit 213 will be described later in detail, however, a summary thereof will be described briefly here. The image conversion unit 211 is configured to generate a conversion image IMG2 by performing an image conversion processing that converts the person image IMG1. The key point extracting unit 212 is configured to extract the key point KP of the target object (the iris in the first example embodiment) that is included in the person image IMG1 from the person image IMG1. Furthermore, the key point extracting unit 212 is configured to extract the key point KP of the target object (the iris in the first example embodiment) that is included in the conversion image IMG2 from the conversion image IMG2.

Note that the key point KP that is extracted from the person image IMG1 is referred to as the "key point KP1" and the key point KP that is extracted from the conversion image IMG2 is referred to as the "key point KP2" to distinguish both in the below described description. The key point KP1 is one specific example of a "target key point" and the key point KP2 is one specific example of a "conversion key point". The score calculation unit 213 is configured to calculate, as a score of the person image IMG1 (hereinafter, it is referred to as an "image score SC"), an index value related to a reliability of the key point KP1 extracted from the person image IMG1 based on the key point KP1 and the key point KP2. Note that the "reliability" in the present example embodiment is an index value for evaluating an error (a difference) between the key point KP1 that is actually extracted from the person image IMG1 by the key point extraction unit 212 and the key point KP1 that should be extracted from the person image IMG1 by the key point extraction unit 212 (namely, a ground truth value of the key point KP1). Typically, the key point KP1 that is actually extracted from the person image IMG1 by the key point extraction unit 212 is more reliable (namely, it is usable without problem as the key point KP1 that should be extracted from the person image IMG1 by the key point extraction unit 212) as the error becomes smaller. Thus, typically, the reliability becomes higher as the error becomes smaller.

The storage apparatus 22 is configured to store a desired data. For example, the storage apparatus 22 may temporarily store the computer program that is executed by the arithmetic apparatus 21. The storage apparatus 22 may temporarily store a data that is temporarily used by the arithmetic apparatus 21 when the arithmetic apparatus 21 executes the computer program. The storage apparatus 22 may store a data that is stored for a long term by the key point extraction apparatus 2. Note that the storage apparatus 22 may include at least one of a RAM (Random Access Memory), a ROM (Read Only Memory), a hard disk apparatus, a magneto-optical disc, a SSD (Solid State Drive) and a disk array apparatus. Namely, the storage apparatus 22 may include a non-transitory recording medium.

The communication apparatus 23 is configured to communicate with the camera 1 through the communication network 3. In the first example embodiment, the communication apparatus 23 receives the person image IMG1 from the camera 1 through the communication network 3.

The input apparatus 24 is an apparatus that receives an input of an information from an outside of the key point extraction apparatus 2 to the key point extraction apparatus 2. For example, the input apparatus 24 may include an operational apparatus (for example, at least one of a keyboard, a mouse and a touch panel) that is operable by an operator of the key point extraction apparatus 2. For example, the input apparatus 24 may include a reading apparatus that is configured to read an information recorded as a data in a recording medium that is attachable to the key point extraction apparatus 2.

The output apparatus 25 is an apparatus that outputs an information to an outside of the key point extraction apparatus 2. For example, the output apparatus 25 may output the information as an image. Namely, the output apparatus 25 may include a display apparatus (what we call a display) that is configured to display the image representing the information to be outputted. For example, the output apparatus 25 may output the information as a sound. Namely, the output apparatus 25 may include an audio apparatus (what we call a speaker) that is configured to output the sound. For example, the output apparatus 25 may output the information on a paper. Namely, the output apparatus 25 may include a print apparatus (what we call a printer) that is configured to print a desired information on the paper.

(1-3) Flow of Key Point Extraction Operation Performed by Key Point Extraction Apparatus 2

Figure 3:
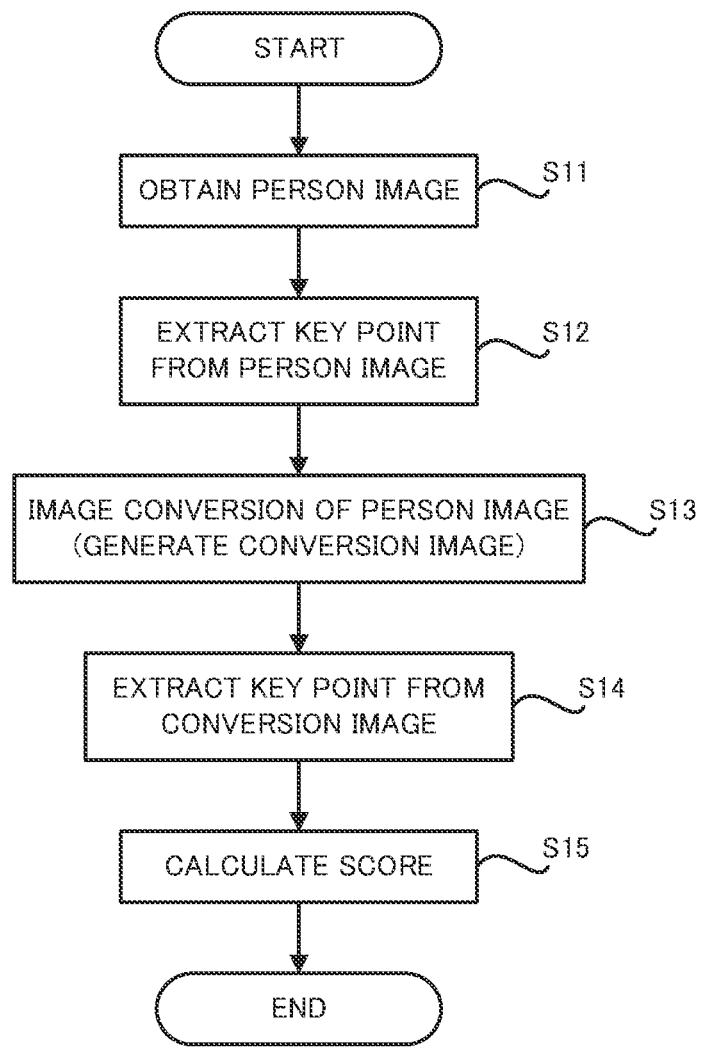
FIG. 3 is a flow chart that illustrates a flow of a key point extraction operation that is performed by the key point extraction apparatus in the first example embodiment.

Next, with reference to FIG. 3, a flow of the key point extraction operation that is performed by the key point extraction apparatus 2 in the first example embodiment will be described. FIG. 3 is a flowchart that illustrates the flow of the key point extraction operation that is performed by the key point extraction apparatus 2 in the first example embodiment.

As illustrated in FIG. 3, the key point extraction apparatus 2 obtains the person image IMG1 from the camera 1 (a step S11). Specifically, the key point extraction apparatus 2 receives the person image IMG1, which is transmitted to the key point extraction apparatus 2 by the camera 1, by using the communication apparatus 23 through the communication network 3.

Then, the key point extraction unit 212 extracts the key point KP (namely, the key point KP1) of the iris that is included in the person image IMG1 from the person image IMG1 obtained at the step S11 (a step S12).

Figure 4:
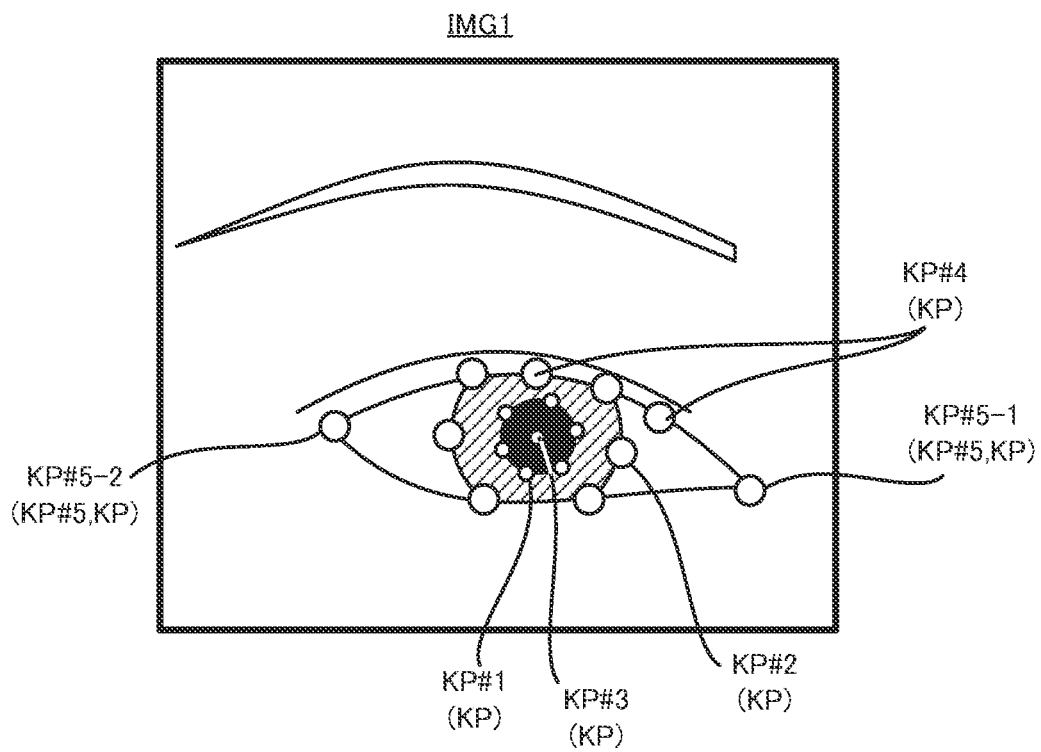
FIG. 4 is a planar view that illustrates one example of a key point of an iris that is extracted from a person image.

The key point KP may include a key point KP that corresponds to a point from which a characteristic part of the target object is determinable. Thus, the key point extraction unit 212 may extract, as the key point KP of the iris, a key point KP that corresponds to a point from which a characteristic part of the iris is determinable. For example, as illustrated in FIG. 4 that illustrates one example of the key point KP of the iris extracted from the person image IMG1, the key point extraction unit 212 may extract, as the key point KP of the iris, a key point KP#1 that corresponds to a point from which an inner outline of the iris (namely, substantially, an outline of a pupil) is determinable. The key point KP#1 may be a point that is located on the inner outline of the iris. For example, as illustrated in FIG. 4, the key point extraction unit 212 may extract, as the key point KP of the iris, a key point KP#2 that corresponds to a point from which an outer outline of the iris is determinable. The key point KP#2 may be a point that is located on the outer outline of the iris. For example, as illustrated in FIG. 4, the key point extraction unit 212 may extract, as the key point KP of the iris, a key point KP#3 that corresponds to a point from which a center of the iris is determinable. The key point KP#3 may be a point that is located on the center of the iris. Note that the key point extraction unit 212 may extract, as the key point KP of the iris, a key point KP that corresponds to a point from which a center of the pupil, which is located on the center of the iris, is determinable, in addition to or instead of the key point KP#3 that corresponds to the point from which the center of the iris is determinable. For example, as illustrated in FIG. 4, the key point extraction unit 212 may extract, as the key point KP of the iris, a key point KP#4 that corresponds to a point from which an edge of an eyelid that is likely to hide the iris partially is determinable. The key point KP#4 may be a point that is located on the edge of the eyelid. For example, as illustrated in FIG. 4, the key point extraction unit 212 may extract, as the key point KP of the iris, a key point KP#5 that corresponds to a point from which an eye including the iris is determinable. As one example, the key point extraction unit 212 may extract, as the key point KP#5, at least one of a key point KP#5-1 that corresponds to a point from which an inner corner of the eye is determinable and a key point KP#5-2 that corresponds to a point from which an outer corner of the eye is determinable.

The key point KP may include a key point KP that corresponds to a line from which the characteristic part of the target object is determinable in addition to or instead of the key point KP that corresponds to the point from which the characteristic part of the target object is determinable. Thus, the key point extraction unit 212 may extract, as the key point KP of the iris, a key point KP that corresponds to a line from which the characteristic part of the iris is determinable. For example, the key point extraction unit 212 may extract, as the key point KP of the iris, a key point KP that corresponds to a line from which the inner outline of the iris is determinable (for example, a line that extends along the inner outline of the iris). For example, the key point extraction unit 212 may extract, as the key point KP of the iris, a key point KP that corresponds to a line from which the outer outline of the iris is determinable (for example, a line that extends along the outer outline of the iris). For example, the key point extraction unit 212 may extract, as the key point KP of the iris, a key point KP that corresponds to a line from which the edge of the eyelid is determinable (for example, a line that extends along the edge of the eyelid). For example, the key point extraction unit 212 may extract, as the key point KP of the iris, a key point KP that corresponds to a line that connects the outer corner of the eye and the inner corner of the eye.

At least one of the point and the line that is extracted as the key point KP may be usable to quantitatively determine the target object. Thus, the key point extraction unit 212 may extract, as the key point KP of the iris, a key point KP that corresponds to at least one of the point and the line that is usable to quantitatively determine the iris. For example, the key point extraction unit 212 may extract, as the key point KP of the iris, a key point KP that corresponds to a line that is usable to determine a size of the iris. As one example, when a shape of the iris is a circular shape, the key point extraction unit 212 may extract, as the key point KP of the iris, a key point KP that corresponds to a line that is usable to determine a radius (for example, a diameter) of the iris that is one example of the size of the iris (for example, a line that passes through the center of the iris and both edges of which exist on the outer outline of the iris). As another example, when the shape of the iris is an oval shape, the key point extraction unit 212 may extract, as the key point KP of the iris, a key point KP that corresponds to a line that is usable to determine at least one of a major diameter and a minor diameter of the iris that are examples of the size of the iris. The line that is usable to determine the major diameter of the iris may include a line that indicates a major axis of the iris, for example. The line that is usable to determine the minor diameter of the iris may include a line that indicates a minor axis of the iris, for example. For example, the key point extraction unit 212 may extract, as the key point KP of the iris, a key point KP that corresponds to a line that is usable to determine a size (for example, a diameter) of the pupil that is located on the center of the iris.

The key point extraction unit 212 may extract the key point KP by using a neural network. Specifically, the key point extraction unit 212 may extract the key point KP by using a neural network that is configured to output the key point KP of the iris included in the person image IMG1 (alternatively, any image including the conversion image IMG2) when the person image IMG1 (alternatively, any image including the conversion image IMG2) is inputted thereto. It is preferable that a parameter of the neural network be learned (trained) by using a training data that includes a training image for learning the parameter of the neural network and a ground truth label of the key point KP of the iris included in the training image (namely, a ground truth key point that is the key point KP that should be extracted from the training image). Note that the neural network is one example of a trainable learning model. Thus, the key point extraction unit 212 may extract the key point KP by using any learning model that is different from the neural network.

An operation for extracting the key point KP may mean an operation for determining a position of the key point KP in the person image IMG1 (for example, a position of the key point KP in the person image IMG1 along each of a height direction and a width direction). In this case, the key point extraction unit 212 may determine the position of the key point KP in the person image IMG1. When the key point KP is extracted by using the neural network as described above, the neural network may output the position of the key point KP in the person image IMG1.

Note that the person (especially, the iris thereof) is not always included properly in the person image IMG1 that is generated by the camera 1. In this case, the key point extraction unit 212 may not extract at least one of a plurality of types of key points KP the examples of which are described by using FIG. 4. Namely, the key point extraction unit 212 may not necessarily extract all of a plurality of types of key points KP. The key point extraction unit 212 may extract at least one key point KP that is extractable from the person image IMG1. The key point extraction unit 212 may not extract at least one key point KP that is not extractable from the person image IMG1. Thus, there is a possibility that the key point extraction unit 212 extracts no key point KP. Furthermore, when the person (especially, the iris thereof) is not included in the person image IMG1, the key point extraction unit 212 may extract no key point KP. Namely, the person (especially, the iris thereof) may not be necessarily included in the person image IMG1 that is inputted to the key point extraction unit 212.

Again in FIG. 3, in parallel with, after or before the operation at the step S12, the image conversion unit 211 performs the image conversion processing that convers the person image IMG1 obtained at the step S11 (a step S13). As a result, the image conversion unit 211 generates the conversion image IMG2 that is the person image IMG1 on which the image conversion processing has been performed (the step S13).

The image conversion processing at the step S13 may include a processing for performing a geometric transformation (in other words, a linear transformation) on the person image IMG1. Namely, the image conversion unit 211 may performs the geometric transformation on the person image IMG1.

An affine transformation is one example of the geometric transformation. Namely, the image conversion processing at the step S13 may include a processing for performing the affine transformation on the person image IMG1. The affine transformation may include a translation. Namely, the image conversion processing at the step S13 may include a translation processing for translating the person image IMG1 along at least one of the height direction and the width direction. The affine transformation may include a rotation. Namely, the image conversion processing at the step S13 may include a rotation processing for rotating the person image IMG1. The affine transformation may include a scaling. Namely, the image conversion processing at the step S13 may include a scaling processing for scaling the person image IMG1. The affine transformation may include a shear. Namely, the image conversion processing at the step S13 may include a shear processing for shearing the person image IMG1.

A flip transform is another example of the geometric transformation. Namely, the image conversion processing at the step S13 may include a processing for performing the flipping transformation on the person image IMG1. For example, the image conversion processing at the step S13 may include a processing for flipping the person image IMG1 horizontally (in other words, flipping it along the width direction (a horizontal direction). Namely, the image conversion processing at the step S13 may include a processing for generating, as the conversion image IMG2, an image that is linearly symmetric with the person image IMG1 with respect to an axis of symmetry that is along the height direction (a vertical direction). For example, the image conversion processing at the step S13 may include a processing for flipping the person image IMG1 vertically (in other words, flipping it along the height direction (the vertical direction). Namely, the image conversion processing at the step S13 may include a processing for generating, as the conversion image IMG2, an image that is linearly symmetric with the person image IMG1 with respect to an axis of symmetry that is along the width direction (the horizontal direction).

The image conversion processing at the step S13 may include a processing for changing a characteristic of at least a part of the person image IMG1. The characteristic of the person image IMG1 may include a brightness (namely, a brightness) of the person image IMG1. In this case, the image conversion processing at the step S13 may include a processing for changing the brightness of at least a part of the person image IMG1. Especially, the image conversion processing at the step S13 may include a processing for changing the brightness of at least one of an image part of the person image IMG1 that corresponds to the iris and an image part of the person image IMG1 that corresponds to a part around the iris. The characteristic of the person image IMG1 may include a contrast (namely, a ratio of the brightness) of the person image IMG1 in addition to or instead of the brightness of the person image IMG1. In this case, the image conversion processing at the step S13 may include a processing for changing the contrast of at least a part of the person image IMG1. Especially, the image conversion processing at the step S13 may include a processing for changing the contrast of at least one of the image part of the person image IMG1 that corresponds to the iris and the image part of the person image IMG1 that corresponds to a part around the iris.

At the step S13, the image conversion unit 211 may generate a single conversion image IMG2. Alternatively, at the step S13, the image conversion unit 211 may generate a plurality of conversion images IMG2. The plurality of conversion images IMG2 may be generated by a plurality of different image conversion processing. For example, the image conversion unit 211 may generate a first conversion image IMG2 by translating the person image IMG1, generate a second conversion image IMG2 by rotating the person image IMG1, generate a third conversion image IMG2 by scaling the person image IMG1, generate a fourth conversion image IMG2 by inverting the person image IMG1, generate a fifth conversion image IMG2 by changing the brightness of the person image IMG1, and generate a sixth conversion image IMG2 by changing the contrast of the person image IMG1.

Then, the key point extraction unit 212 extracts the key point KP (namely, the key point KP2) of the iris that is included in the conversion image IMG2 from the conversion image IMG2 generated at the step S13 (a step S14). Note that an operation for extracting the key point KP2 at the step S14 may be same as the operation for extracting the key point KP1 at the step S12. Thus, a detailed description of the operation for extracting the key point KP2 at the step S14 is omitted.

When the plurality of conversion images IMG2 are generated at the step S13, the key point extraction unit 212 may extract the key point KP2 from each of the plurality of conversion images IMG2. For example, when the mage conversion unit 211 generates the first conversion image IMG2 to the sixth conversion image IMG2 as described above, the key point extracting unit 212 may extract a first key point KP2 from the first conversion image IMG2, extract a second key point KP2 from the second conversion image IMG2, extract a third key point KP2 from the third conversion image IMG2, extract a fourth key point KP2 from the fourth conversion image IMG2, extract a fifth key point KP2 from the fifth conversion image IMG2, and extract a sixth key point KP2 from the sixth conversion image IMG2.

Then, the score calculation unit 213 calculates the image score SC of the person image IMG1 (a step S15). Note that the image score SC of the person image IMG1 is the index value related to the reliability of the key point KP1 extracted from the person image IMG1 as described above. Next, the image score SC will be described.

A quality of the person image IMG1 from which the key point extraction unit 212 extracts the key point KP1 is not always constant. For example, there is a possibility that the quality of the person image IMG1 that is inputted to the key point extraction unit 212 at one timing is relatively high and the quality of the person image IMG1 that is inputted to the key point extraction unit 212 at another timing that is different from one timing is relatively low. The higher the quality of the person image IMG1 is, the higher the possibility that the key point extraction unit 212 is capable of reliably extracting the key point KP1 that should be extracted is. Moreover, the higher the quality of the person image IMG1 is, the higher the possibility that the key point extraction unit 212 is capable of extracting the key point KP1 that should be extracted is with high accuracy. Note that an accuracy of the key point KP1 here is an index value for quantitatively evaluating a difference between the position of the key point KP1 extracted by the key point extraction unit 212 and an actual position of the key point KP1. The smaller the difference between the position of the key point KP1 extracted by the key point extraction unit 212 and the actual position of the key point KP1 is, the higher the key point KP1 extracted by the key point extraction unit 212 is. Thus, there is a high possibility that the accuracy of the key point KP1 extracted by the key point extraction unit 212 becomes lower as the quality of the person image IMG1 inputted to the key point extracting unit 212 is lower. Namely, there is a high possibility that the position of the key point KP1 extracted by the key point extraction unit 212 is farther from the real position of the key point KP1 as the quality of the person image IMG1 inputted to the key point extracting unit 212 is lower. Furthermore, in some cases, the lower the quality of the person image IMG1 inputted to the key point extracting unit 212 is, the higher the possibility that the key point extraction unit 212 is not capable of extracting the key point KP1 that should be extracted. Thus, it is estimated that the reliability of the key point KP1 extracted by the key point extraction unit 212 is lower as the quality of the person image IMG1 inputted to the key point extracting unit 212 is lower. From this viewpoint, the score calculation unit 213 calculates, as the image score SC that allows the quality of the person image IMG1 to be evaluated quantitatively, the index value related to the reliability of the key point KP1 extracted from the person image IMG1.

It can be said that the person image IMG1 from which the key point extracting unit 212 has difficulty extracting the key point KP1 is the person image IMG1 that is incompatible to the key point extraction unit 212. Similarly, it can be said that the person image IMG1 from which the key point extracting unit 212 is not capable of extracting the key point KP1 with high accuracy is the person image IMG1 that is incompatible to the key point extraction unit 212. Thus, the image score SC may be regarded to be an index value for quantitatively evaluating a compatibility of the person image IMG1 to the key point extracting unit 212. Note that the compatibility of the person image IMG1 to the key point extracting unit 212 may mean an easiness of the extraction of the key point KP1 (especially, an easiness of the extraction of the accurate key point KP1) from the person image IMG1 by the key point extraction unit 212.

When the key point extraction unit 212 extracts the key point KP1 by using the trainable neural network (alternatively, any trainable learning model) as described above, it can be said that the person image IMG1 from which the key point extracting unit 212 has difficulty extracting the key point KP1 is the person image IMG1 that is not sufficiently learned by the learning model.

Similarly, it can be said that the person image IMG1 from which the key point extracting unit 212 is not capable of extracting the key point KP1 with high accuracy is the person image IMG1 that is not sufficiently learned by the learning model. Thus, the image score SC may be regarded to be an index value for quantitatively evaluating a degree of shortage of the learning of the person image IMG1 by the learning model (namely, a degree of shortage of the learning of the person image IMG1 by the key point extraction unit 212).

There is a possibility that the quality of the person image IMG1 is affected by a state of an object (in this case, the person) included in the person image IMG1. Thus, the image score SC may be regarded to be an index value for quantitatively evaluating the state of the object (in this case, the person) included in the person image IMG1. For example, presence or absence of glasses is one example of the state of the person included in the person image IMG1. Specifically, when the person included in the person image IMG1 does not wear the glasses, the illumination light from the illumination apparatus 4 is not reflected by the glasses. Thus, the camera 1 is capable of capturing the image of the eye (especially, the iris) of the person without being affected by a reflection light of the illumination light by the glasses. Namely, the eye (especially, the iris) of the person is included in the person image IMG1 properly. In this case, there is a relatively high possibility that the key point extraction unit 212 is capable of extracting the key point KP1 of the iris from the person image IMG1 with relatively high accuracy. On the other hand, when the person included in the person image IMG1 wears the glasses, there is a possibility that the illumination light from the illumination apparatus 4 is reflected by the glasses. Thus, there is a possibility that the camera 1 is affected by the reflection light of the illumination light by the glasses. Namely, there is a possibility that the eye (especially, the iris) of the person is not included in the person image IMG1 properly. For example, there is a possibility that a part of the eye (especially, the iris) of the person that should exists in the rear of a lens of the glasses is hidden by an image of the reflection light on the lens of the glasses in the person image IMG1. In this case, there is a possibility that the key point extraction unit 212 is not capable of extracting the key point KP1 of the iris from the person image IMG1 with high accuracy. Thus, the score calculation unit 213 may calculate the image score SC so that the image score SC of the person image IMG1 including the person that wears the glasses is worse than the image score SC of the person image IMG1 including the person that does not wear the glasses. However, in the first example embodiment, the score calculation unit 213 calculates the image score SC based on the key point KP extracted by the key point extraction unit 212 without directly determining whether or not the person that wears the glasses is included in the person image IMG1, as described later. However, the score calculation unit 213 may calculate the image score SC by directly determining whether or not the person that wears the glasses is included in the person image IMG1.

On the other hand, even when the person included in the person image IMG1 wears the glasses, there is a possibility that the key point extraction unit 212 is capable of extracting the key point KP1 of the iris from the person image IMG1 with relatively high accuracy, depending on an illumination condition of the illumination light from the illumination apparatus 4. Specifically, there is a possibility that the key point extraction unit 212 is capable of extracting the key point KP1 of the iris from the person image IMG1, which is generated by capturing the image of the person in a situation where the illumination condition is a first condition, with relatively high accuracy and is not capable of extracting the key point KP1 of the iris from the person image IMG1, which is generated by capturing the image of the person in a situation where the illumination condition is a second condition that is different from the first condition, with relatively high accuracy. Namely, there is a possibility that the quality of the person image IMG1 is affected by the illumination condition that affects the state of the object (in this case, the person) included in the person image IMG1. Thus, the image score SC may be regarded to be an index value for quantitatively evaluating the illumination condition. Conversely, the score calculating unit 213 may calculate the image score SC that varies depending on the illumination condition. However, in the first example embodiment, the score calculation unit 213 calculates the image score SC based on the key point KP extracted by the key point extraction unit 212 without directly using the illumination condition, as described later. However, the score calculation unit 213 may calculate the image score SC based on the illumination condition.

At the step S15, the score calculation unit 123 calculates the image score SC of the person image IMG1 based on the key point KP1 extracted at the step S12 and the key point KP2 extracted at the step S14. Here, when the quality of the person image IMG1 is relatively high, the key point extraction unit 212 is capable of extracting the key point KP1 with relatively high accuracy as described above. Thus, a difference between the key point KP1 extracted from the person image IMG1 by the key point extraction unit 212 and the actual key point KP1 is relatively small. Furthermore, a difference between the key point KP2 extracted from the person image IMG2, which is generated by performing the image conversion processing on the person image IMG1, by the key point extraction unit 212 and an actual key point KP2 is also relatively small. Therefore, when the quality of the person image IMG1 is relatively high, it is estimated that a difference between the key point KP1 and the key point KP2 (namely, a difference between the position of the key point KP1 and the position of the key point KP2) is relatively small. On the other hand, when the quality of the person image IMG1 is relatively low, there is a possibility that the key point extraction unit 212 is not capable of extracting the key point KP1 with relatively high accuracy. Thus, it is estimated that the difference between the key point KP1 and the key point KP2 is relatively large. This is because there is a possibility that the difference between the key point KP1 extracted by the key point extraction unit 212 and the actual key point KP1 is different from the difference between the key point KP2 extracted by the key point extraction unit 212 and the actual key point KP2 because there is a possibility that the key point extraction unit 212 is not capable of extracting the key point KP1 (furthermore, the key point KP2) with relatively high accuracy.

Thus, it is estimated that the difference (namely, a margin) between the key point KP1 and the key point KP2 includes an information related to the quality of the person image IMG1. Therefore, the score calculation unit 213 may compare the key point KP1 and the key point KP2 and calculate the image score SC based on a comparison result of the key point KP1 and the key point KP2.

When the key point extraction unit 212 extracts the plurality of types of key points KP as illustrated in FIG. 4, the score calculation unit 213 may compare the key point KP1 and the key point KP2 for each type of the key point KP. For example, the score calculation unit 213 may compare a first type of key point KP1 and the same first type of key point KP2, compare a second type of key point KP1 and the same second type of key point KP2, ..., and compare a n-th (n is a variable number indicating an integer that is equal to or larger than 2) type of key point KP1 and the same n-th type of key point KP2. As one example, the score calculation unit 213 may compare the key point KP1 from which the inner outline of the iris is determinable and the key point KP2 from which the inner outline of the same iris is determinable, compare the key point KP1 from which the outer outline of the iris is determinable and the key point KP2 from which the inner outline of the same iris is determinable, and compare the key point KP1 from which the center of the iris is determinable and the key point KP2 from which the center of the same iris is determinable. In this case, the when the key point extraction unit 212 extracts then types of key points KP, the score calculation unit 213 may compare the key point KP1 and the key point KP2 for all of the n types of key points KP. Alternatively, the score calculation unit 213 may compare the key point KP1 and the key point KP2 for a part of the n types of key points KP and may not compare the key point KP1 and the key point KP2 for another part of the n types of key points KP. Then, the score calculation unit 213 may calculate the image score SC based on a plurality of comparison results that correspond to the plurality of types of key points KP, respectively. For example, the score calculation unit 213 may calculate the image score SC based on a mean value (for example, a simple mean value or a square mean value) of the plurality of comparison results. The score calculation unit 213 may calculate the image score SC based on a total sum (for example, a simple total sum or a square total sum) of the plurality of comparison results.

When the plurality of conversion images IMG2 are generated at the step S13 and the plurality of key points KP2 are extracted from the plurality of conversion images IMG2, respectively, at the step S14, the score calculation unit 213 may compare the key point KP1 and the plurality of key points KP2. For example, when the key point extraction unit 212 extracts the first key point KP2 to the sixth key point KP2 from the first conversion image IMG2 to the sixth conversion image IMG2, respectively, as described above, the score calculation unit 213 may compare the key point KP1 and the first key point KP2, compare the key point KP1 and the second key point KP2, compare the key point KP1 and the third key point KP2, compare the key point KP1 and the fourth key point KP2, compare the key point KP1 and the fifth key point KP2, and compare the key point KP1 and the sixth key point KP2. Then, the score calculation unit 213 may calculate the image score SC based on a plurality of comparison results that correspond to the plurality of key points KP2, respectively. For example, the score calculation unit 213 may calculate the image score SC based on a mean value (for example, a simple mean value or a square mean value) of the plurality of comparison results. The score calculation unit 213 may calculate the image score SC based on a total sum (for example, a simple total sum or a square total sum) of the plurality of comparison results.

The score calculation unit 213 may calculate the difference between the key point KP1 and the key point KP2 by comparing the key point KP1 and the key point KP2. In this case, the score calculation unit 213 may calculate the image score SC based on the difference that corresponds to the comparison result. For example, the score calculation unit 213 may calculate the image score SC so that the image score SC becomes worse as the difference becomes larger. In other words, the score calculation unit 213 may calculate the image score SC so that the image score SC becomes better as the difference becomes smaller. As one example, the score calculation unit 213 may calculate the image score SC that becomes larger as the difference becomes larger. In this case, it can be said that the quality of the person image IMG1 is worse (in other words, the reliability of the extracted key point KP1 is lower) as the image score SC becomes larger. As another example, the score calculation unit 213 may calculate the image score SC that becomes smaller as the difference becomes larger. In this case, it can be said that the quality of the person image IMG1 is better (in other words, the reliability of the extracted key point KP1 is higher) as the image score SC becomes larger.

The key point extraction unit 212 determines the position of the key point KP when it extracts the key point KP as described above. since the position of the key point KP is determined, the score calculation unit 213 may calculate a distance between the key point KP1 and the key point KP2 as the difference between the key point KP1 and the key point KP2.

However, the position of the key point KP1 is determined as a position in the person image IMG1 and the position of the key point KP2 is determined as a position in the conversion image IMG2. Thus, a coordinate system for determining the position of the key point KP1 (namely, a coordinate system in the person image IMG1) is not always same as a coordinate system for determining the position of the key point KP2 (namely, a coordinate system in the conversion image IMG2). On the other hand, the key point extraction apparatus 2 is capable of converting a position of either one of the first coordinate system and the second coordinate system to a position of the other one of the first coordinate system and the second coordinate system, because the key point extraction 2 itself generates the conversion image IMG2 by performing the image conversion processing on the person image IMG1. Thus, the score calculation unit 213 may convert the key point KP2 in the second coordinate system extracted at the step S14 to the key point KP2 in the first coordinate system before calculating the image score SC. Namely, the score calculation unit 213 may convert the position of the key point KP2 in the second coordinate system extracted at the step S14 to the position of the key point KP2 in the first coordinate system before calculating the image score SC. Then, the score calculation unit 213 may calculate the image score SC based on the key point KP1 in the first coordinate system and the key point KP2 in the first coordinate system. For example, the score calculation unit 213 may calculate the difference between the key point KP1 and the key point KP2 in the first coordinate system and calculate the image score SC based on the difference.

As described above, when there is a possibility that the key point extraction unit 212 is not capable of extracting the key point KP with relatively high accuracy, there is a possibility that a variation of the extracted key point KP becomes large depending on a situation where the key point KP is extracted. Thus, the score calculation unit 213 may calculate a standard deviation of the key point KP (in other words, a variation (in other words, a degree of dispersion) of the key point KP1 and the key point KP2)) by comparing the key point KP1 and the key point KP2, and calculate the image score SC based on the standard deviation that corresponds to the comparison result. In this case, the score calculation unit 213 may calculate the image score SC so that the image score SC becomes worse as the standard deviation becomes larger. In other words, the score calculation unit 213 may calculate the image score SC so that the image score SC becomes better as the standard deviation becomes smaller. As one example, the score calculation unit 213 may calculate the image score SC that becomes larger as the standard deviation becomes larger. In this case, it can be said that the quality of the person image IMG1 is worse (in other words, the reliability of the extracted key point KP1 is lower) as the image score SC becomes larger. As another example, the score calculation unit 213 may calculate the image score SC that becomes smaller as the standard deviation becomes larger. In this case, it can be said that the quality of the person image IMG1 is better (in other words, the reliability of the extracted key point KP1 is higher) as the image score SC becomes larger.

The score calculation unit 213 may calculate the standard deviation of the key point KP when the key point extraction unit 212 extracts the plurality of key points KP2 from the plurality of conversion images IMG2, respectively. This is because a reliability of the standard deviation becomes lower when the number of sample in a general population (namely, a total number of the key point KP1 and the key point KP2 that are used to calculate the standard deviation) is excessively small.

(1-4) Technical Effect of Key Point Extraction Apparatus 2

As described above, the key point extraction apparatus 2 in the first example embodiment is capable of calculating the image score SC. The image score SC is the index value related to the reliability of the key point KP1 extracted from the person image IMG1 and index value that is capable of quantitatively evaluating the quality of the person image IMG1. Thus, the key point extraction apparatus 2 is capable of taking various countermeasures by using the image score SC so that the key point extraction apparatus 2 is capable of extracting the key point KP1 from the person image IMG1 with high accuracy.

For example, there is a possibility that the person image IMG1 from which the relatively bad image score SC is calculated is an image the quality of which is so bad that the key point extraction unit 212 is not capable of extracting the key point KP1 with high accuracy therefrom (namely, it is evaluated that the reliability of the extracted key point KP1 is relatively low). Thus, when the relatively bad image score SC is calculated, it is expected that a necessity for improving the quality of the person image IMG1 is relatively high. Therefore, in this case, the key point extraction apparatus 2 may take a countermeasure for improving the quality of the person image IMG1. Note that changing the illumination condition of the illumination light by the illumination apparatus 4 is one example of the countermeasure for improving the quality of the person image IMG1, however, this countermeasure will be described in a second example embodiment described later.

For example, there is a possibility that the person image IMG1 from which the relatively bad image score SC is calculated is an image that is not sufficiently learned by the key point extraction unit 212 to allow the key point extraction unit 212 not to be capable of extracting the key point KP1 with high accuracy therefrom (namely, it is evaluated that the reliability of the extracted key point KP1 is relatively low). Thus, when the relatively bad image score SC is calculated, it is expected that a necessity for performing the training of the key point extraction unit 212 (specifically, the training of the above described learning model) by using the person image IMG1 having the relatively bad image score SC. Therefore, the key point extraction apparatus 2 is capable of performing the training of the key point extraction unit 212 by using the person image IMG1 the image score SC of which is relatively bad.

Moreover, in the first example embodiment, the key point extraction apparatus 2 is configured to calculate the image score SC by comparing the key point KP1 that is extracted from the person image IMG1 and the key point KP2 that is extracted from the conversion image IMG2 that is generated by performing the image conversion processing on the person image IMG1. As described above, the difference between the key point KP1 and the key point KP2 is relatively small when the quality of the person image IMG1 is relatively high, and the difference between the key point KP1 and the key point KP2 is relatively large when the quality of the person image IMG1 is relatively low. Thus, the key point extraction apparatus 2 is capable of calculating the image score SC properly by comparing the key point KP1 and the key point KP2.

(1-5) Modified Example of Key Point Extraction Apparatus 2

In the above described description, the key point extraction apparatus 2 includes the single key point extraction unit 212 that is configured to extract the key point KP from the person image IMG1 and that is configured to extract the key point KP from the conversion image IMG2. However, the key point extraction apparatus 2 may include a key point extraction unit that is configured to extract the key point KP from the person image IMG1 and a key point extraction unit that is configured to extract the key point KP from the conversion image IMG2 separately.

(2) Key Point Extraction System SYS in Second Example Embodiment

Next, the key point extraction system SYS in a second example embodiment will be described. Note that the key point extraction system SYS in the second example embodiment is referred to as a "key point extraction system SYSb" in the below described description.

Figure 5:
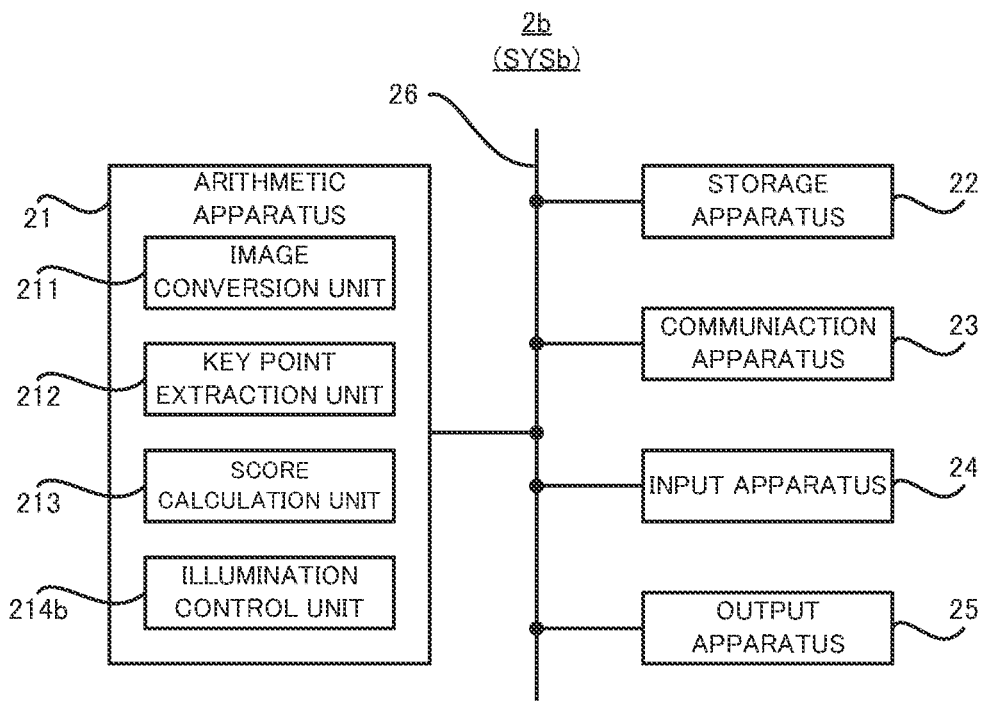
FIG. 5 is a block diagram that illustrates a configuration of a key point extraction apparatus in a second example embodiment.

The key point extraction system SYSb in the second example embodiment is different from the above described key point extraction system SYSa in the first example embodiment in that it includes a key point extraction apparatus 2b instead of the key point extraction apparatus 2. Another feature of the key point extraction system SYSb may be same as another feature of the key point extraction system SYSa. Thus, in the below describe description, with reference to FIG. 5, the key point extraction apparatus 2b in the second example embodiment will be described. FIG. 5 is a block diagram that illustrates the configuration of the key point extraction apparatus 2b in the second example embodiment. Note that a detailed description of the component that is already described is omitted by assigning the same reference number thereto. Moreover, a detailed description of a process that is already described is omitted by assigning the same step number thereto.

As illustrated in FIG. 5, the key point extraction apparatus 2b in the second example embodiment is different from the key point extraction apparatus 2 in the first example embodiment in that an illumination control unit 214b that is one specific example of an "illumination controlling unit" is implemented in the arithmetic apparatus 21. Another feature of the key point extraction apparatus 2b may be same as another feature of the key point extraction apparatus 2.

The illumination control unit 214b is configured to control the illumination apparatus 4. Specifically, the illumination control unit 214b is configured to control (specifically, configured to change) the illumination condition of the illumination light by the illumination apparatus 4 by controlling the illumination apparatus 4. The illumination condition may include a condition of the illumination light itself (hereinafter, it is referred to as a "light condition"), for example. The light condition may include at least one of an intensity of the illumination light and a wavelength of the illumination light, for example. The illumination condition may include a condition of the illumination apparatus 4 itself (hereinafter, it is referred to as an "apparatus condition"), for example. The apparatus condition may include at least one of a position of the illumination apparatus 4 (namely, an emission position from which the illumination light is emitted from the illumination apparatus 4) and a direction of the illumination apparatus 4 (namely, an attitude of the illumination apparatus 4, and an emission direction along which the illumination apparatus 4 emits the illumination light), for example.

Especially, the illumination control unit 214b may control the illumination apparatus 4 based on the image score SC calculated by the score calculation unit 213. Specifically, the illumination control unit 214b may control the illumination apparatus 4 so that the image score SC is improved (namely, becomes better). As described above, when the image score SC becomes larger as the quality of the person image IMG1 becomes better (in other words, the reliability of the extracted key point KP1 becomes higher) as described above, the illumination control unit 214b may control the illumination apparatus 4 so that the image score SC increases (alternatively, becomes maximum). When the image score SC becomes smaller as the quality of the person image IMG1 becomes better (in other words, the reliability of the extracted key point KP1 becomes higher) as described above, the illumination control unit 214b may control the illumination apparatus 4 so that the image score SC decreases (alternatively, becomes minimum).

In order to control the illumination apparatus 4 so that the image score SC is improved, the camera 1 may capture the image of the person in each of a plurality of situations between which the illumination condition is different. Specifically, the illumination control unit 214b may control the illumination apparatus 4 so that the illumination condition is set to be a first condition, and the camera 1 may generate an person image IMG1#21 by capturing the image of the person in a situation where the illumination condition is set to be the first condition. Then, the illumination control unit 214b may control the illumination apparatus 4 so that the illumination condition is set to be a second condition that is different from the first condition, and the camera 1 may generate an person image IMG1#22 by capturing the image of the person in a situation where the illumination condition is set to be the second condition. Then, the score calculation unit 213 may calculate an image score SC#21 of the person image IMG1#21 and an image score SC#22 of the person image IMG1#22. Then, the illumination control unit 214b may set the illumination condition so that the image score SC is improved by comparing the image score SC#21 and the image score SC#22. For example, the image score SC#21 is better than the image score SC#22, the illumination control unit 214b may control the illumination apparatus 4 so that the illumination condition that is used in the subsequent operation is set to be the second condition. Subsequently, the camera 1 captures the image of the person in a situation where the illumination condition is set to be the second condition. Note that the illumination control unit 214b may repeats an operation for changing the illumination condition and setting the illumination condition based on a comparison result of the image scores SC before and after the illumination condition is changed, if needed. As a result, the illumination condition is changed so that the image score SC is improved more.

A scene in which the camera 1 captures the person that wears the glasses is one example of a scene in which the image score SC is improved by an operation of the illumination control unit 214b. As described above, when the camera 1 captures the person that wears the glasses, the person that wears the glasses is included in the person image IMG1. In this case, there is a possibility that the illumination light from the illumination apparatus 4 is reflected by the glasses. Thus, there is a possibility that the eye (especially, the iris) of the person is not included in the person image IMG1 properly. For example, there is a possibility that a part of the eye (especially, the iris) of the person that should be exists in the rear of the lens of the glasses is hidden by the image of the reflection light on the lens of the glasses in the person image IMG1. On the other hand, when the illumination condition is changed, there is a possibility that a reflection aspect of the illumination light by the lens of the glasses changes. As a result, there is a possibility that a part of the eye (especially, the iris) of the person, which has been hidden by the image of the reflection light on the lens of the glasses, is included in the person image IMG1. In this case, it is possible to evaluate, based on the image score SC, whether or not the eye (especially, the iris) of the person is included in the person image IMG1 properly. This is because the image score SC become relatively bad when a part of the eye (especially, the iris) of the person is hidden by the image of the reflection light on the lens of the glasses and the image score SC become relatively better when a part of the eye (especially, the iris) of the person is not hidden by the image of the reflection light on the lens of the glasses. Thus, in this case, the illumination control unit 214b is capable of controlling the illumination apparatus 4 so that a part of the eye (especially, the iris) of the person is not hidden by the image of the reflection light on the lens of the glasses (as a result, the image score SC is improved).

In this manner, in the second example embodiment, the key point extraction apparatus 2b is capable of controlling the illumination apparatus 4 so that the key point extraction unit 212 is capable of extracting the key point KP1 with high accuracy (namely, it is evaluated that the reliability of the extracted key point KP1 is relatively high). Thus, the key point extraction apparatus 2b is capable of taking the countermeasure for improving the quality of the person image IMG1 while achieving an effect that is same as an effect that is achievable by the key point extraction apparatus 2 in the first example embodiment.

Note that the illumination control unit 214b may control the illumination apparatus 4 so that the image score SC is improved in a period during which an operation using the key point KP extracted by the key point extraction unit 212 (for example, the above described operation for authenticating the person by using the iris) is performed. The illumination control unit 214b may control the illumination apparatus 4 so that the image score SC is improved before the operation using the key point KP extracted by the key point extraction unit 212 (for example, the above described operation for authenticating the person by using the iris) is started.

(3) Key Point Extraction System SYS in Third Example Embodiment

Next, the key point extraction system SYS in a third example embodiment will be described. Note that the key point extraction system SYS in the third example embodiment is referred to as a "key point extraction system SYSc" in the below described description.

Figure 6:
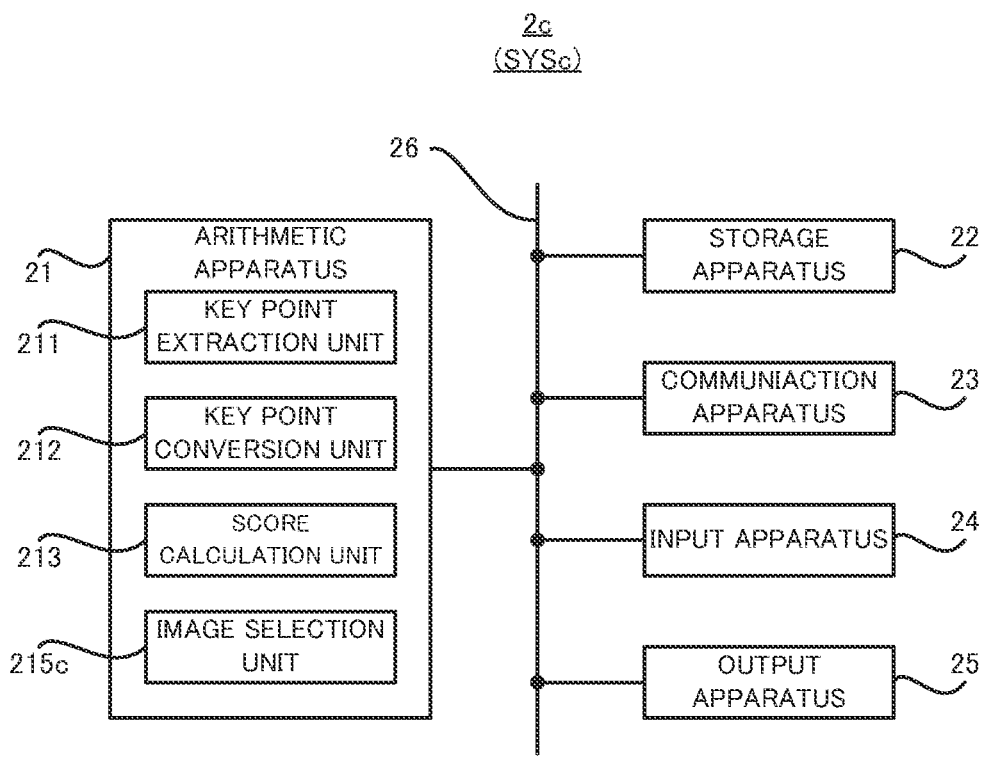
FIG. 6 is a block diagram that illustrates a configuration of a key point extraction apparatus in a third example embodiment.

The key point extraction system SYSc in the third example embodiment is different from the above described key point extraction system SYSa in the first example embodiment in that it includes a key point extraction apparatus 2c instead of the key point extraction apparatus 2. Another feature of the key point extraction system SYSc may be same as another feature of the key point extraction system SYSa. Thus, in the below describe description, with reference to FIG. 6, the key point extraction apparatus 2c in the third example embodiment will be described. FIG. 6 is a block diagram that illustrates the configuration of the key point extraction apparatus 2c in the second example embodiment.

As illustrated in FIG. 6, the key point extraction apparatus 2c in the third example embodiment is different from the key point extraction apparatus 2 in the first example embodiment in that an image selection unit 215c that is one specific example of an "image selecting unit" is implemented in the arithmetic apparatus 21. Another feature of the key point extraction apparatus 2c may be same as another feature of the key point extraction apparatus 2.

The image selection unit 215c selects the person image IMG1 having the image score SC that is calculated by the score calculation unit 213 and that satisfies a predetermined selection standard. Specifically, the image calculation unit 213 typically calculates the image score SC of the newly generated person image IMG1 every time the camera 1 newly captures the image of the person (namely, every time the person image IMG1 is newly generated). Thus, the score calculation unit 213 typically calculates the image score SC of each of the plurality of person images IMG1. The image selection unit 215c selects the person image IMG1 the image score SC of which satisfies the predetermined selection condition from the plurality of person images IMG1.

The selected person image IMG1 may be used for a desire use. For example, the selected person image IMG1 may be used for a use of the training of the key point extraction unit 212 (specifically, the training of the learning model used by the above described key point extraction unit 212). When the selected person image IMG1 is used for the desire use, the selection standard that is used to select the person image IMG1 may be set based on the desired use. For example, the selection standard may be set based on the use of the training of the learning model.

A first standard that the image score SC is worse than a predetermined selection threshold value is one example of the selection standard that is set based on the use of the training of the learning model. In this case, the image selection unit 215c selects the person image IMG1 the image score SC of which is worse than the selection threshold value. For example, when the image score SC becomes larger as the quality of the person image IMG1 becomes better (in other words, the reliability of the extracted key point KP1 becomes higher) as described above, the image selection unit 215c selects the person image IMG1 the image score SC of which is smaller than the selection threshold value. For example, when the image score SC becomes smaller as the quality of the person image IMG1 becomes better (in other words, the reliability of the extracted key point KP1 becomes higher) as described above, the image selection unit 215c selects the person image IMG1 the image score SC of which is larger than the selection threshold value.

When the first standard is used as the selection standard, the image selection unit 215c selects the person image IMG1 the image score SC of which is relatively bad. As described in the first example embodiment, there is a relatively high possibility that the person image IMG1 the image score SC of which is relatively bad is the person image IMG1 that is not sufficiently learned by the learning model. Thus, when the first standard is used as the selection standard, the image selection unit 215c is capable of selecting the person image IMG1 that is not sufficiently learned by the learning model. As a result, the training of the learning model is performed by using the person image IMG1 that is not sufficiently learned by the learning model. Thus, the training of the learning model is performed more efficiently, compared to a case where the training of the learning model is performed by using the person image IMG1 that is sufficiently learned by the learning model. Namely, a training efficiency of the learning model improves.

Note that the selection threshold value that is used by the first standard may be set to be a desired value that allows the person image IMG1 that is not sufficiently learned by the learning model (namely, that is incompatible to the learning model) to be distinguished from the person image IMG1 that is sufficiently learned by the learning model (namely, that is compatible to the learning model) by the image score SC.

Figure 7:
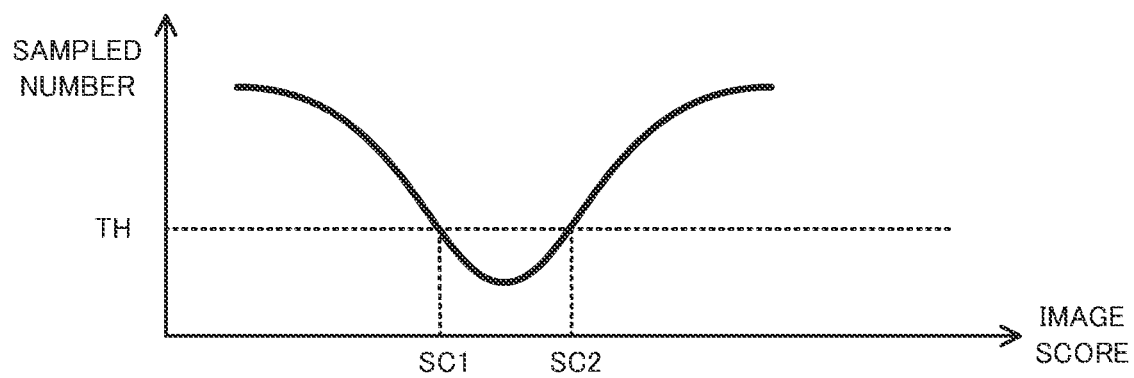
FIG. 7 is a graph that illustrates a relationship between the sampled number of a training image and an image score SC of the training image.

A second standard that the image score SC is included in a range of the image score SC into which a training image, the sampled number of which is smaller than a predetermined number, is classified when a plurality of training images that are already learned by the learning model are classified based on the image score SC in a situation where the learning model is already trained by using the plurality of training images the image scores of which are known. For example, FIG. 7 illustrates a relationship between the sampled number of the training image and the image score SC of the training image. Namely, FIG. 7 illustrates the sampled number of the training image having a certain image score SC for each image score SC. Here, in an example illustrated in FIG. 7, the predetermined number is set to be a threshold value TH. In this case, as illustrated in FIG. 7, the range of the image score SC in which the sampled number of the training image is smaller than the predetermined number (=threshold value TH) is a range of "a predetermined score SC1<the image score SC. A second predetermined score SC2". Therefore, in the example illustrated in FIG. 7, the image selection unit 215c selects the person image IMG1 the image score SC of which is larger than the predetermined score SC1 and is smaller than the predetermined score SC2.

When the second standard is used as the selection standard, the image selection unit 215c selects the person image IMG1 the image score SC of which is different from that of the training image that is already learned by the learning model. There is a relatively high possibility that the person image IMG1 the image score SC of which is different from that of the training image that is already learned by the learning model is the person image IMG1 that is not sufficiently learned by the learning model. Thus, when the second standard is used as the selection standard, the image selection unit 215c is capable of selecting the person image IMG1 that is not sufficiently learned by the learning model. As a result, the training of the learning model is performed by using the person image IMG1 that is not sufficiently learned by the learning model. Thus, the training of the learning model is performed more efficiently, compared to a case where the training of the learning model is performed by using the person image IMG1 that is sufficiently learned by the learning model. Namely, a training efficiency of the learning model improves.

Note that the predetermined number (for example, the threshold value TH in FIG. 7) that is used by the second standard may be set to be a desired value that allows the person image IMG1 that is not sufficiently learned by the learning model (namely, that is incompatible to the learning model) to be distinguished from the person image IMG1 that is sufficiently learned by the learning model (namely, that is compatible to the learning model) by the sampled number thereof.

When a supervised learning is performed to perform the training of the learning model by using the person image IMG1, it is desired to generate training data including the person image IMG1 and a ground truth label by assigning, to the person image IMG1, the ground truth label of the key point KP that should be extracted from the person image IMG1 (namely, performing an annotation). However, it typically takes a lot of effort to assigning the ground truth label. However, when the first standard or the second standard is used as the selection condition, it is sufficient to assign the ground truth label to the person image IMG1 that is selected based on the first standard or the second standard from the plurality of person images IMG1. It is not necessary to assigning the ground truth label to all of the plurality of person images IMG1. Thus, in the second example embodiment, the effort required for assigning the ground truth label is reduced. Namely, the effort required for generating the training data is reduced.

Note that the image selection unit 215c may select the person image IMG1 that satisfies both of the first standard and the second standard. For example, the image selection unit 215c may select a plurality of person images IMG1 the image scores SC of which satisfy the first standard from the plurality of person images IMG1 and then select a plurality of person images IMG1 that satisfy the second standard from the plurality of person images IMG1 the image scores SC of which satisfy the first standard.

In this manner, in the third example embodiment, the key point extraction apparatus 2c is capable of selecting (for example, collecting) the person image IMG1 the image score SC of which satisfies the selection condition. Thus, the key point extraction apparatus 2c is capable of performing a desired operation (for example, the training of the learning model used by the key point extraction unit 212) by using the selected person image IMG1 while achieving an effect that is same as the effect that is achievable by the key point extraction apparatus 2 in the first example embodiment.

Note that the key point extraction apparatus 2b in the second example embodiment described above may include a feature that is unique to the key point extraction apparatus 2c in the third example embodiment. The feature that is unique to the key point extraction apparatus 2c in the third example embodiment may include the image selection unit 215c. The feature that is unique to the key point extraction apparatus 2c in the third example embodiment may include a feature related to a selection of the person image IMG1 based on the image score SC.

(4) Key Point Extraction System SYS in Fourth Example Embodiment

Next, the key point extraction system SYS in a fourth example embodiment will be described. Note that the key point extraction system SYS in the fourth example embodiment is referred to as a "key point extraction system SYSd" in the below described description.

Figure 8:
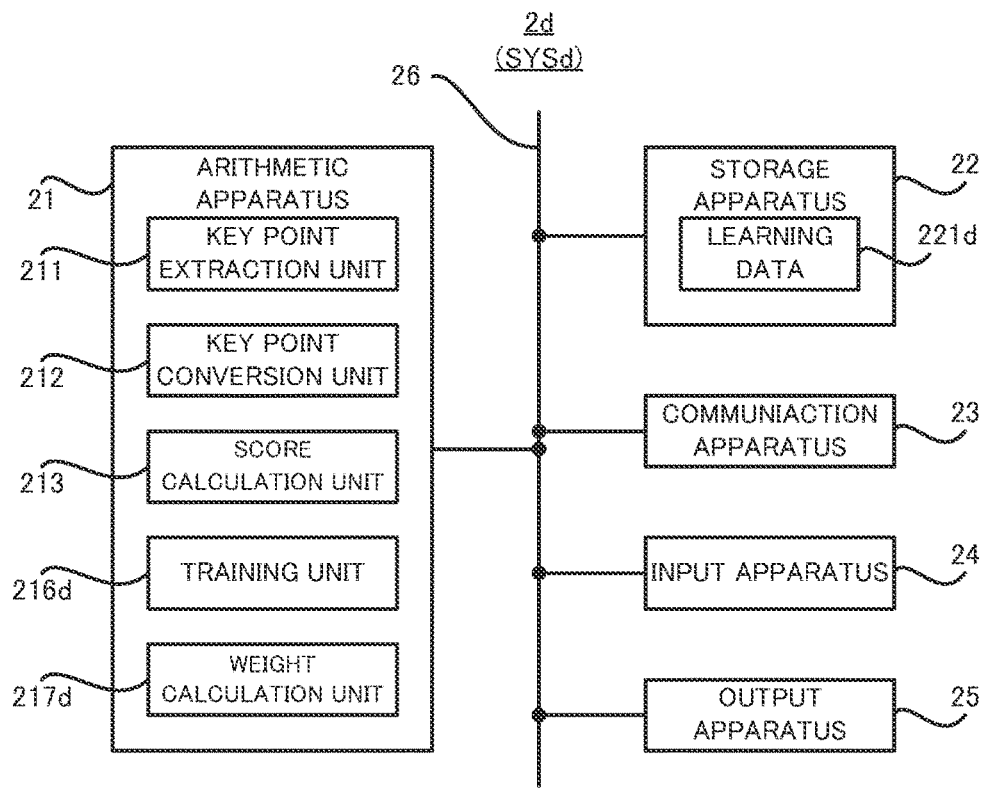
FIG. 8 is a block diagram that illustrates a configuration of a key point extraction apparatus in a fourth example embodiment.

The key point extraction system SYSd in the fourth example embodiment is different from the above described key point extraction system SYSa in the first example embodiment in that it includes a key point extraction apparatus 2d instead of the key point extraction apparatus 2. Another feature of the key point extraction system SYSd may be same as another feature of the key point extraction system SYSa. Thus, in the below describe description, with reference to FIG. 8, the key point extraction apparatus 2d in the fourth example embodiment will be described. FIG. 8 is a block diagram that illustrates the configuration of the key point extraction apparatus 2d in the fourth example embodiment.

As illustrated in FIG. 8, the key point extraction apparatus 2d in the fourth example embodiment is different from the key point extraction apparatus 2 in the first example embodiment in that a training unit 216d that is one specific example of a "training unit" and a weight calculation unit 217d that is one specific example of the "training unit" are implemented in the arithmetic apparatus 21. Furthermore, the key point extraction apparatus 2d is different from the key point extraction apparatus 2 in that the storage apparatus 22 stores training data 221d that is used for the training of the learning model used by the key point extraction unit 212. Another feature of the key point extraction apparatus 2d may be same as another feature of the key point extraction apparatus 2.

The training unit 216d performs the training of the learning model, which is used by the key point extraction unit 212, by using the training data 221d. In the fourth example embodiment, the training unit 216d performs the training of the learning model by performing a semi-supervised learning using the training data 221d. Thus, the training unit 216d performs the training of the learning model by using the training data 221d for performing the semi-supervised learning.

Figure 9:
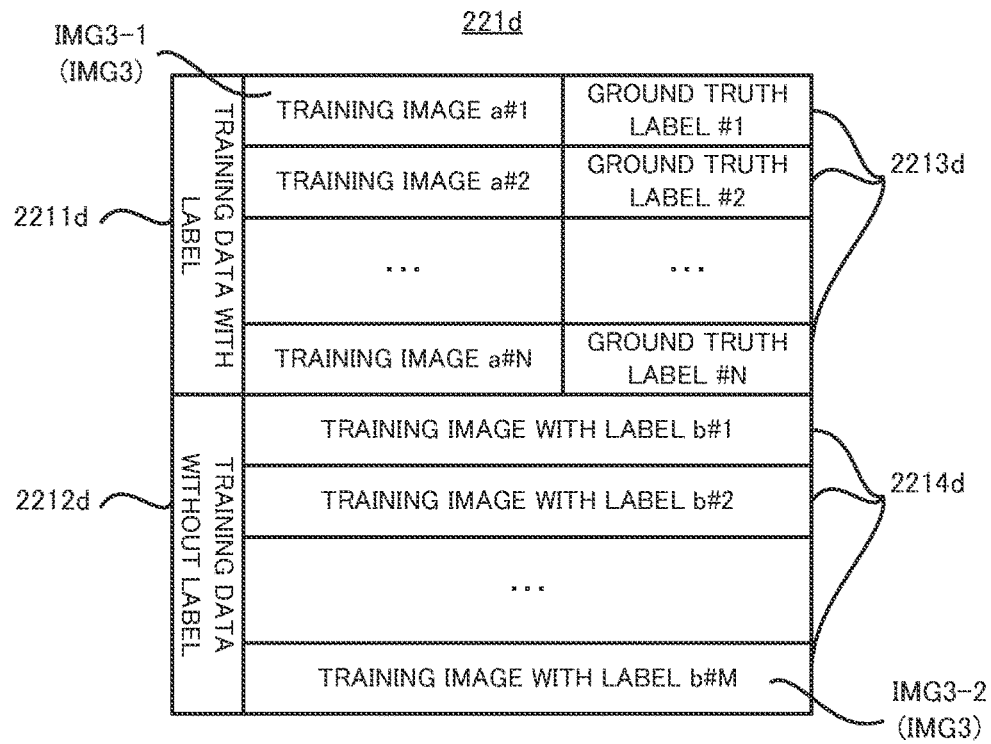
FIG. 9 illustrates one example of training data.

FIG. 9 illustrates one example of the training data 221d for performing the semi-supervised learning. As illustrated in FIG. 9, the training data 221d includes training data 2211d with label and training data 2212d without label. The training data 2211d with label is a data set including a plurality of unit data 2213d with label each of which includes a training image IMG3 and a ground truth label that indicates the key point KP that should be extracted from the training image IMG3. On the other hands, the training data 2212d without label is a data set including a plurality of unit data 2214d without label each of which includes the training image IMG3 but does not include the ground truth label. In the below described description, the training image IMG3 included in the training data 2211d with label is referred to as the "training image IMG3-1" and the training image IMG3 included in the training data 2212d without label is referred to as the "training image IMG3-2". The number of the training image IMG3-1 included in the training data 2211d with label (namely, the number of the unit data 2213d with label) may be smaller than the number of the training image IMG3-2 included in the training data 2212d without label (namely, the number of the unit data 2214d with label).

The training unit 216d may perform the training of the learning model by using an existing algorithm for performing the semi-supervised learning. For example, the training unit 216d may perform the training of the learning model by using an algorithm based on a bootstrap method. In this case, the training unit 216d may firstly perform the training of the learning model by using the training data 2211d with label. The training of the learning model by using the training data 2211d with label may be the supervised learning. Then, the training unit 216d may assign a pseudo label, which indicates the key point KP that is estimated to be extracted from each training image IMG3-2, to at least a part of the plurality of training image IMG3-2 included in the training data 2212d without label based on a result of the training using the training data 2211d with label. For example, the training unit 216d assigns the pseudo label to at least one training image IMG3-2 having a relatively high reliability of training image IMG3-2 included in the training data 2212d without label. Here, the "training image IMG3-2 having the relatively high reliability" here may mean the training image IMG3-2 that a certainty of the key point KP that is estimated to be extracted therefrom is relatively high. Then, the training unit 216d may perform the training of the learning model by using the training data 2211d with label and the unit data 2214d without label to which the pseud label is assigned of the training data 2212d without label. The training of the learning model by using the training data 2211d with label and the unit data 2214d without label to which the pseud label is assigned of the training data 2212d without label may also be the supervised learning. The training unit 216d may repeat an operation that includes an assignation of the pseud label and the supervised learning (namely, the training of the learning model by using the training data 2211d with label and the unit data 2214d without label to which the pseud label is assigned of the training data 2212d without label) by necessary times. Thus, in the third example embodiment, the number of epoch is the number of times by which the operation that includes the assignation of the pseud label and the supervised learning is repeated. For example, the training unit 216d may repeat the supervised learning and the assignation of the pseud label alternately until a loss function satisfies a predetermined learning end condition. As a result, the semi-supervised learning is completed.

The weight calculation unit 217d calculates a weight w of the pseud label. In order to calculate the weight w of the pseud label, the weight calculation unit 217d may use the image scores SC of the plurality of training images IMG3-2 included in the training data 2212d without label.

Thus, the key point extraction apparatus 2d may perform the key point extraction operation illustrated in FIG. 3 for the plurality of training images IMG3-2 included in the training data 2212d without label. Namely, the key point extraction apparatus 2d may obtain the training image IMG3-2 (the step S11 in FIG. 3), the key point extraction unit 212 may extract the key point KP from the training image IMG3-2 (the step S12 in FIG. 3), the image conversion unit 211 may calculate the conversion image IMG2 by performing the image conversion processing that convers the training image IMG3-2 (the step S13), the key point extraction unit 212 may extract the key point KP from the conversion image IMG2 (the step S14 in FIG. 3), and the score calculation unit 213 may calculate the image score SC of the training image IMG3-2 based on the key point KP extracted from the training image IMG3-2 and the key point KP extracted from the conversion image IMG2 (the step S15 in FIG. 3).

Then, the weight calculation unit 217d calculates the weight w of the pseud label that is assigned to each training image IMG3-2 based on the image score SC of each training image IMG3-2. For example, the weight calculation unit 217d may calculate the weight w so that the weight w of the pseud label that is assigned to one training image IMG3-2 becomes larger as the image score SC of one training image IMG3-2 becomes better. For example, the weight calculation unit 217d may calculate the weight w so that the weight w of the pseud label that is assigned to one training image IMG3-2 becomes smaller as the image score SC of one training image IMG3-2 becomes worse. As one example, the weight calculation unit 217d may calculates an inverse number of the image score SC as the weight w. note that the weight w may be a value that is equal to or larger than 0 and that is equal to or smaller than 1.

The calculated weight w may be used by the training unit 216d that performs the semi-supervised learning. For example, in order to perform the training of the learning model, the training unit 216d may use the unit data 2214d without label to which the pseud label having the relatively large weight w is assigned. For example, in order to perform the training of the learning model, the training unit 216d may use the unit data 2214d without label to which the pseud label having the weight w larger than a predetermined weight threshold value is assigned. On the other hand, for example, in order to perform the training of the learning model, the training unit 216d may not use the unit data 2214d without label to which the pseud label having the relatively small weight w is assigned. For example, in order to perform the training of the learning model, the training unit 216d may not use the unit data 2214d without label to which the pseud label having the weight w smaller than the predetermined weight threshold value is assigned. Namely, in order to perform the training of the learning model, the training unit 216d may use the training image IMG3-2 to which the pseud label having the relatively large weight w is assigned preferentially. As a result, in order to perform the training of the learning model, the training unit 216d uses the leaning image IMG3-2 the quality of which is relatively good (namely, the training image IMG3-2 that the possibility of precisely extracting the key point KP1 by the learning model therefrom is relatively high) preferentially. In this case, the number of the training image IMG3-2 that the possibility of precisely extracting the key point KP1 by the learning model therefrom is relatively high gradually increases as the semi-supervised learning is performed more. Namely, it is possible to reduce an opportunity for the training that uses the training image IMG3-2 that the possibility of precisely extracting the key point KP1 by the learning model therefrom is relatively low at an early phase of the training at which the semi-supervised learning is not sufficiently performed.

Note that the weight threshold value may be set to be a desired value that allows the training image IMG3-2 that is not sufficiently learned by the learning model (namely, that is incompatible to the learning model) to be distinguished from the training image IMG3-2 that is sufficiently learned by the learning model (namely, that is compatible to the learning model) by the image score SC.

The weight calculation unit 217d may calculate new weight w every time the training unit 216d performs the training of the learning model one time (namely, performs the operation including the assignation of the pseud label and the supervised learning one time). Namely, the weight calculation unit 217d may calculate the weight w for each epoch. This is because a behavior of the key point extraction unit 212 changes every time the training unit 216d performs the training of the learning model one time, and thus, there is a possibility that the image score SC that is calculated based on the key point KP extracted by the key point extraction unit 212 changes and the weight w that is calculated based on the image score SC changes.

In this manner, in the fourth example embodiment, the key point extraction apparatus 2d is capable of performing the training of the learning model by using the training data 221d and the weight w that is calculated based on the image score SC. Thus, thus, the key point extraction apparatus 2d is capable of performing the training of the learning model efficiently while achieving an effect that is same as the effect that is achievable by the key point extraction apparatus 2 in the first example embodiment. Furthermore, the key point extraction apparatus 2d is capable of performing the training of the learning model efficiently by reducing the effort for the annotation, because the training of the learning model is performed by using the semi-supervised learning.

Note that at least one of the key point extraction apparatus 2b in the second example embodiment to the key point extraction apparatus 2c in the third example embodiment described above may include a feature that is unique to the key point extraction apparatus 2d in the fourth example embodiment. The feature that is unique to the key point extraction apparatus 2d in the fourth example embodiment may include the training unit 216d and the weight calculation unit 217d. The feature that is unique to the key point extraction apparatus 2d in the fourth example embodiment may include a feature related to the semi-supervised leaning using the weight w.

(5) Key Point Extraction System SYS in Fifth Example Embodiment

Next, the key point extraction system SYS in a fifth example embodiment will be described. Note that the key point extraction system SYS in the fifth example embodiment is referred to as a "key point extraction system SYSe" in the below described description.

Figure 10:
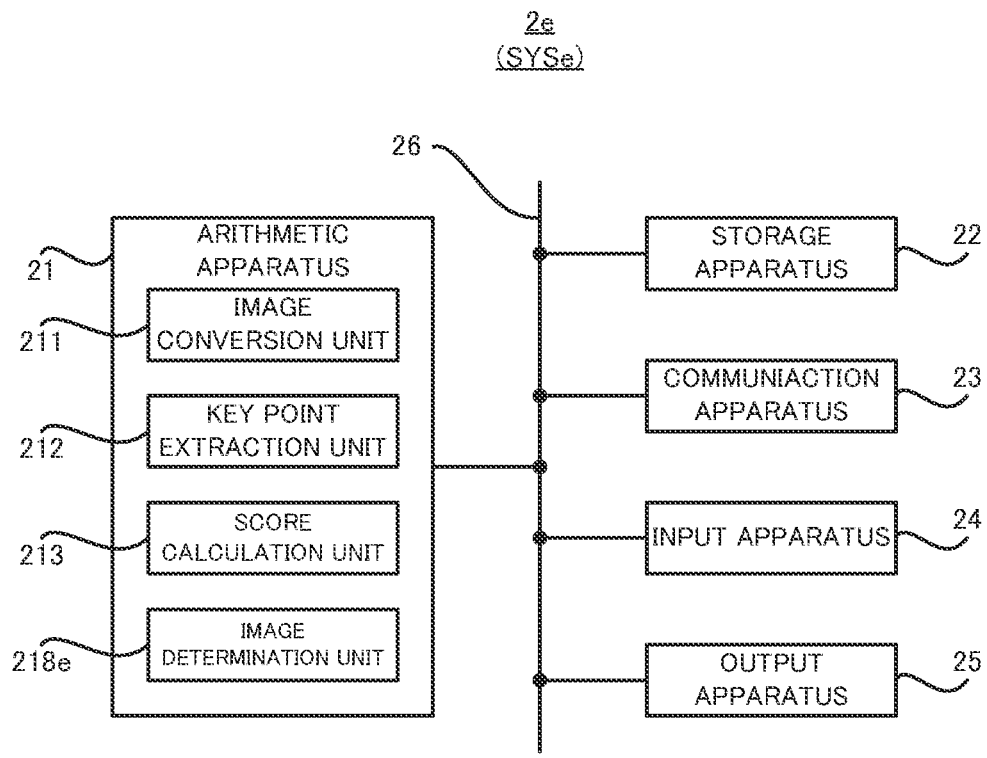
FIG. 10 is a block diagram that illustrates a configuration of a key point extraction apparatus in a fifth example embodiment.

The key point extraction system SYSe in the fifth example embodiment is different from the above described key point extraction system SYSa in the first example embodiment in that it includes a key point extraction apparatus 2e instead of the key point extraction apparatus 2. Another feature of the key point extraction system SYSe may be same as another feature of the key point extraction system SYSa. Thus, in the below describe description, with reference to FIG. 10, the key point extraction apparatus 2e in the fifth example embodiment will be mainly described. FIG. 10 is a block diagram that illustrates the configuration of the key point extraction apparatus 2e in the fifth example embodiment.

As illustrated in FIG. 10, the key point extraction apparatus 2e in the fifth example embodiment is different from the key point extraction apparatus 2 in the first example embodiment in that an image determination unit 218*e* that is one specific example of a "determining unit" is implemented in the arithmetic apparatus 21. Another feature of the key point extraction apparatus 2*e* may be same as another feature of the key point extraction apparatus 2.

The image determination unit 218*e* may determine based on the image score SC whether or not the eye including the iris of the person is included in the person image IMG1. In order to determine whether or not the eye is included in the person image IMG1, the image determination unit 218*e* may determine whether or not the calculated image score SC is worse than a predetermined first determination threshold value TH1. For example, when the image score SC becomes larger as the quality of the person image IMG1 becomes better, the image determination unit 218*e* may determine whether or not the calculated image score SC is smaller than the predetermined first determination threshold value TH1. For example, when the image score SC becomes larger as the quality of the person image IMG1 becomes worse, the image determination unit 218*e* may determine whether or not the calculated image score SC is larger than the predetermined first determination threshold value TH1. As a result of the determination, when it is determined that the image score SC is worse than the predetermined first determination threshold value TH1, the image determination 218*e* may determine that the eye is not included in the person image IMG1. This is because the key point KP of the iris is not extracted when the eye is not included in the person image IMG1 and thus the image score SC becomes worse. On the other hand, when it is determined that the image score SC is better than the predetermined first determination threshold value TH1, the image determination 218*e* may determine that the eye is included in the person image IMG1.

When the eye is not included in the person image IMG1, there is a possibility that a state where the image score SC is worse than the predetermined first determination threshold value TH1 continues for a certain time or more. Thus, the image determination 218*e* may determine that the eye is not included in the person image IMG1 when the state where the image score SC is worse than the predetermined first determination threshold value TH1 continues for a second determination threshold value TH2 or more. On the other hand, the image determination 218*e* may determine that the eye is included in the person image IMG1 when the state where the image score SC is worse than the predetermined first determination threshold value TH1 continues only for a time that is shorter than the second determination threshold value TH2. Namely, even when it is determined that the image score SC is worse than the predetermined first determination threshold value TH1, the image determination 218*e* may determine that the eye is included in the person image IMG1 when the state where the image score SC is worse than the predetermined first determination threshold value TH1 continues for the time that is shorter than the second determination threshold value TH2. This is because there is a possibility that the image score SC is determined to be worse than the predetermined first determination threshold value TH1 when the person included in the person image IMG1 blinks, even when the eye is included in the person image IMG1.

Conversely, when the state where the image score SC is worse than the predetermined first determination threshold value TH1 continues for the time that is shorter than the second determination threshold value TH2, the image determination unit 218*e* may determine that the eye is included in the person image IMG1 but the eye included in the person image IMG1 blinks. Namely, when the state where the image score SC is worse than the predetermined first determination threshold value TH1 continues for the time that is shorter than the second determination threshold value TH2 in a situation where it is determined that the eye is included in the person image IMG1, the image determination unit 218*e* may determine that the eye included in the person image IMG1 blinks during that time.

In order to determine whether or not the state where the image score SC is worse than the predetermined first determination threshold value TH1 continues for the second determination threshold value TH2 or more, the camera 1 may generate the plurality of person images IMG1 that corresponds to time-series data by continuously capturing the image of the same person. Furthermore, the key point extraction apparatus 2 may calculate the plurality of image scores SC that correspond to the plurality of person images IMG1, respectively. The plurality of calculated image scores SC indicate a temporal variation of the image score SC. Thus, the image determination unit 218 is capable of determining based on the temporal variation of the image score SC whether or not the state where the image score SC is worse than the predetermined first determination threshold value TH1 continues for the second determination threshold value TH2 or more.

Note that the first determination threshold value TH1 may be set to be a desired value that allows the person image IMG1 in which the eye is included to be distinguished from the person imagen IMG1 in which the eye is not included by the image score SC. The second determination threshold value TH2 may be set to be a desired value that allows the person image IMG1 in which a blinking (namely, closed) eye is included to be distinguished from the person imagen IMG1 in which the eye is not included by the image score SC.

In this manner, in the fifth example embodiment, the key point extraction apparatus 2*e* is capable of determining whether or not the eye is included in the person image IMG1. In this case, the key point extraction apparatus 2*e* may exclude the person image IMG1 in which the eye is not included from a target for the operation performed by using the key point KP (for example, the above described operation for authenticating the person by using the iris). As a result, a time required for the operation performed by using the key point KP is reducible.

Moreover, in the fifth example embodiment, the key point extraction apparatus 2*e* is capable of determining whether or not the eye included in the person image IMG1 blinks. In this case, the key point extraction apparatus 2*e* may exclude the person image IMG1 in which the blinking (namely, closed) eye is included from the target for the operation performed by using the key point KP. As a result, the time required for the operation performed by using the key point KP is reducible.

Therefore, the key point extraction apparatus 2*e* is capable of reducing the time required for the operation performed by using the key point KP while achieving an effect that is same as the effect that is achievable by the key point extraction apparatus 2 in the first example embodiment.

Note that at least one of the key point extraction apparatus 2*b* in the second example embodiment to the key point extraction apparatus 2*d* in the fourth example embodiment described above may include a feature that is unique to the key point extraction apparatus 2*e* in the fifth example embodiment. The feature that is unique to the key point extraction apparatus 2*e* in the fifth example embodiment may include the image determination unit 218*e*. The feature that is unique to the key point extraction apparatus 2*e* in the fifth example embodiment may include a feature related to at least one of the determination whether or not the eye is included in the person image IMG1 and the determination whether or not the eye included in the person image IMG1 blinks.

(6) Key Point Extraction System SYS in Sixth Example Embodiment

Next, the key point extraction system SYS in a sixth example embodiment will be described. Note that the key point extraction system SYS in the sixth example embodiment is referred to as a "key point extraction system SYSf" in the below described description.

Figure 11:
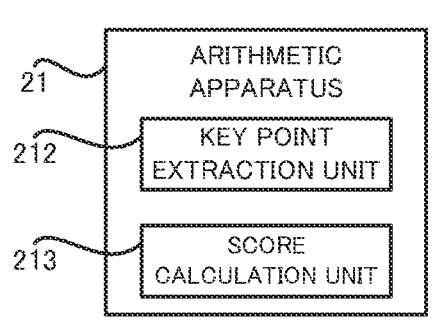
FIG. 11 is a block diagram that illustrates a configuration of a key point extraction apparatus in a sixth example embodiment.

The key point extraction system SYSf in the sixth example embodiment is different from the above described key point extraction system SYSa in the first example embodiment in that it includes a key point extraction apparatus 2f instead of the key point extraction apparatus 2. Another feature of the key point extraction system SYSf may be same as another feature of the key point extraction system SYSa. Thus, in the below describe description, with reference to FIG. 11, the key point extraction apparatus 2f in the sixth example embodiment will be mainly described. FIG. 11 is a block diagram that illustrates the configuration of the key point extraction apparatus 2f in the sixth example embodiment.

As illustrated in FIG. 11, the key point extraction apparatus 2f in the sixth example embodiment is different from the key point extraction apparatus 2 in the first example embodiment in that the arithmetic apparatus 21 may not include the image conversion unit 211. Another feature of the key point extraction apparatus 2f may be same as another feature of the key point extraction apparatus 2. Note that the key point extraction apparatus 2f may not include the storage apparatus 22, the communication apparatus 23, the input apparatus 24 and the output apparatus 25. However, the key point extraction apparatus 2f may include at least one of the storage apparatus 22, the communication apparatus 23, the input apparatus 24 and the output apparatus 25.

In the above described description about the first example embodiment to the fifth example embodiment, the key point extraction apparatus 2 calculates the image score SC by comparing the key point KP1 extracted from the person image IMG1 and the key point KP2 extracted from the conversion image IMG2 that is generated by performing the image conversion processing on the person image IMG1. However, the key point extraction apparatus 2f in the sixth example embodiment may calculate the image score SC without generating the conversion image IMG2. The key point extraction apparatus 2f may calculate the image score SC by using the key point KP1 and without using the key point KP2.

Note that at least one of the key point extraction apparatus 2b in the second example embodiment to the key point extraction apparatus 2e in the fifth example embodiment described above may not include the image conversion unit 211 either.

(7) Supplementary Note

With respect to the example embodiments described above, the following Supplementary Notes will be further disclosed.

Supplementary Note 1

An information processing apparatus including:
an extracting unit that extracts a key point of a target object as a target key point from an input image; and
a calculating unit that calculates, as a score of the input image from which the target key point is extracted, an index value related to a reliability of the target key point based on the target key point.

Supplementary Note 2

The information processing apparatus according to Supplementary Note 1 further including an image converting unit that generates a conversion image by performing an image conversion processing that converts the input image,
the extracting unit extracting a key point of the target object as a conversion key point from the conversion image,
the calculating unit calculating the score based on a comparison result of the target key point and the conversion key point.

Supplementary Note 3

The information processing apparatus according to Supplementary Note 1 or 2, wherein
the input image is generated by an imaging apparatus capturing an image of an imaging target range that is illuminated by an illumination apparatus,
the information processing apparatus further includes an illumination control apparatus that controls the illumination apparatus based on the score so that the score is improved.

Supplementary Note 4

The information processing apparatus according to any one of Supplementary Notes 1 to 3, wherein
the extracting unit extracts the target key point from each of a plurality of input images,
the calculating unit calculates the score for each input image,
the information processing apparatus further includes a selecting unit that selects, from the plurality of input images, at least one input image the score of which satisfies a predetermined selection condition.

Supplementary Note 5

The information processing apparatus according to Supplementary Note 4, wherein
the selection condition includes a condition that the score is worse than a predetermined selection threshold value.

Supplementary Note 6

The information processing apparatus according to Supplementary Note 4 or 5, wherein
the extracting unit extracts the target key point by using a leaning model that is already trained by using a plurality of training images the score of each of which is known,
the selection condition includes a condition that the score is included in a range of the score in which the sampled number of the training image is smaller than a predetermined number.

Supplementary Note 7

The information processing apparatus according to any one of Supplementary Notes 1 to 6, wherein
the extracting unit extracts the target key point by using a leaning model that is trainable,
the information processing apparatus further includes a training unit that performs a training of the learning model by using training data that includes a first training image with which a ground truth key point, which is a key point to be extracted, is associated and a second training image with which the ground truth key point is not associated,
the extracting unit extracts a key point of the target object as a training key point from the second training image,
the calculating unit calculates, as a score of the second training image from which the training key point is extracted, an index value related to a reliability of the training key point based on the training key point,
the training unit calculates, based on the score of the second training image, a weight that indicates a degree of a contribution of the second training image to the training of the learning model, and performs the training of the learning model by performing a semi-supervised learning using the training data and the weight.

Supplementary Note 8

The information processing apparatus according to any one of Supplementary Notes 1 to 7, wherein
the target object includes an iris of a living body,
the information processing apparatus further includes a determining unit that determines that an eye including the iris is not included in the input image when the score is worse than a predetermined first determination threshold value.

Supplementary Note 9

The information processing apparatus according to Supplementary Note 8, wherein
the determining unit determines that a blinking eye is included in the input image when it is determined that the eye is included in the input image and a time during which the score keeps being worse than a predetermined second threshold value is shorter than a predetermined time.

Supplementary Note 10

An information processing method including:
extracting a key point of a target object as a target key point from an input image; and
calculating, as a score of the input image from which the target key point is extracted, an index value related to a reliability of the target key point based on the target key point.

Supplementary Note 11

A recording medium on which a computer program that allows a computer to execute an information processing method is recorded,
the information processing method comprising:
extracting a key point of a target object as a target key point from an input image; and
calculating, as a score of the input image from which the target key point is extracted, an index value related to a reliability of the target key point based on the target key point.

At least a part of the feature of each embodiment described above may be combined with at least other part of the feature of each embodiment described above. A part of the feature of each embodiment described above may not be used. Moreover, the disclosures of all documents (for example, publications) that are cited in the present disclosure described above are incorporated in the present disclosure by reference if it is legally permitted.

The present disclosure is allowed to be changed, if desired, without departing from the essence or spirit of the invention which can be read from the claims and the entire specification, and an information processing apparatus, an information processing method, a computer program and a recording medium, which involve such changes, are also intended to be within the technical scope of the present disclosure.

DESCRIPTION OF REFERENCE CODES 1 camera
2 key point extraction apparatus
21 arithmetic apparatus
211 image conversion unit
212 key point extraction unit
213 score calculation unit
214b illumination control unit
215c image selection unit
216d weight calculation unit
217d training unit
218e image determination unit
3 communication network
4 illumination apparatus
SYS key point extraction system
IMG1 person image
IMG2 conversion image
KP key point

What is claimed is:

1. An information processing apparatus comprising:
at least one memory configured to store instructions; and
at least one processor configured to execute the instructions to:
extract a key point of a target object, which is distinguished from a feature amount, from an input image as a target key point; and
calculate, as a score of the input image from which the target key point is extracted, an index value related to a reliability of the target key point based on the target key point,
wherein the target object includes an iris of a living body,
wherein the at least one processor is configured to execute the instructions to determine that an eye including the iris is not included in the input image when the score is less than a predetermined first determination threshold value, and
wherein the at least one processor is configured to execute the instructions to determine that a blinking eye is included in the input image when it is determined that the eye is included in the input image and a time during which the score keeps being less than a predetermined second threshold value is shorter than a predetermined time.

2. The information processing apparatus according to claim 1, wherein the at least one processor is configured to execute the instructions to:
  generate a conversion image by performing an image conversion processing that converts the input image;
  extract a key point of the target object as a conversion key point from the conversion image; and
  calculate, as the score, the index value based on a comparison result of the target key point and the conversion key point.

3. The information processing apparatus according to claim 1, wherein
  the input image is generated by an imaging apparatus capturing an image of an imaging target range that is illuminated by an illumination apparatus, and
  the at least one processor is configured to execute the instructions to control the illumination apparatus based on the score so that the score is improved.

4. The information processing apparatus according to claim 1, wherein
  the at least one processor is configured to execute the instructions to:
  extract the target key point from each of a plurality of input images;
  calculate, as the score, the index value for each input image; and
  select, from the plurality of input images, at least one input image the score of which satisfies a predetermined selection condition.

5. The information processing apparatus according to claim 4, wherein
  the predetermined selection condition includes a condition that the score is less than a predetermined selection threshold value.

6. The information processing apparatus according to claim 4, wherein
  the at least one processor is configured to execute the instructions to: extract the target key point by using a leaning model that is already trained by using a plurality of training images the score of each of which is known,
  the predetermined selection condition includes a condition that the score is included in a range into which the training image, the sampled number of which is smaller than a predetermined number, is classified when the plurality of training images are classified based on the score.

7. The information processing apparatus according to claim 1, wherein
  the at least one processor is configured to execute the instructions to:
  extract the target key point by using a leaning model;
  perform a training of the learning model by using training data that includes a first training image with which a ground truth key point, which is a key point to be extracted, is associated and a second training image with which the ground truth key point is not associated;
  extract a key point of the target object as a training key point from the second training image;
  calculate, as a score of the second training image from which the training key point is extracted, an index value related to a reliability of the training key point based on the training key point; and
  calculate, based on the score of the second training image, a weight that indicates a degree of a contribution of the second training image to the training of the learning model, and perform the training of the learning model by performing a semi-supervised learning using the training data and the weight.

8. The information processing apparatus according to claim 1, wherein
  the key point is a feature point used to extract the feature amount.

9. An information processing method comprising:
  extracting a key point of a target object, which is distinguished from a feature amount, from an input image as a target key point; and
  calculating, as a score of the input image from which the target key point is extracted, an index value related to a reliability of the target key point based on the target key point,
  wherein the target object includes an iris of a living body, and the method further comprises:
  determining that an eye including the iris is not included in the input image when the score is less than a predetermined first determination threshold value; and
  determining that a blinking eye is included in the input image when it is determined that the eye is included in the input image and a time during which the score keeps being less than a predetermined second threshold value is shorter than a predetermined time.

10. A non-transitory recording medium on which a computer program that allows a computer to execute an information processing method is recorded,
  the information processing method comprising:
  extracting a key point of a target object, which is distinguished from a feature amount, from an input image as a target key point; and
  calculating, as a score of the input image from which the target key point is extracted, an index value related to a reliability of the target key point based on the target key point,
  wherein the target object includes an iris of a living body, and the method further comprises:
  determining that an eye including the iris is not included in the input image when the score is less than a predetermined first determination threshold value; and
  determining that a blinking eye is included in the input image when it is determined that the eye is included in the input image and a time during which the score keeps being less than a predetermined second threshold value is shorter than a predetermined time.

* * * * *